(12) United States Patent
Park et al.

(10) Patent No.: US 11,190,700 B2
(45) Date of Patent: *Nov. 30, 2021

(54) IMAGE PROCESSING SYSTEMS FOR CORRECTING PROCESSED IMAGES USING IMAGE SENSORS

(71) Applicant: SAMSUNG ELECTRONICS CO., LTD., Suwon-si (KR)

(72) Inventors: Dong-Jin Park, Hwaseong-si (KR); Jeehong Lee, Seoul (KR); Seongyeong Jeong, Suwon-si (KR); Duck-soo Kim, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/840,805

(22) Filed: Apr. 6, 2020

(65) Prior Publication Data

US 2020/0236286 A1    Jul. 23, 2020

Related U.S. Application Data

(63) Continuation of application No. 15/692,159, filed on Aug. 31, 2017, now Pat. No. 10,652,471.

(30) Foreign Application Priority Data

Oct. 5, 2016   (KR) .................. 10-2016-0128474

(51) Int. Cl.
*H04N 5/232* (2006.01)
*H04N 5/247* (2006.01)
(Continued)

(52) U.S. Cl.
CPC ....... *H04N 5/23296* (2013.01); *G02B 13/001* (2013.01); *G02B 13/009* (2013.01);
(Continued)

(58) Field of Classification Search
CPC ............. G02B 13/0015; G02B 13/009; G02B 27/0075; G06K 9/00228; H04N 5/2258;
(Continued)

(56) References Cited

U.S. PATENT DOCUMENTS 5,594,676 A   1/1997   Greggain et al.
6,798,897 B1   9/2004   Rosenberg
(Continued)

FOREIGN PATENT DOCUMENTS

CN   104104919 A   10/2014
CN   204206364 U   3/2015
(Continued)

*Primary Examiner* — James T Boylan
(74) *Attorney, Agent, or Firm* — Myers Bigel, P.A.

(57) ABSTRACT

An image processing system may include a first image sensor, a second image sensor, and an image processing device. The image processing device may be configured to obtain a first image and a second image by respectively processing the first image data and the second image data. The image processing device may output an image based on the first image when a zoom factor of the output image is lower than a first reference value, generate a correction image by correcting locations of second reference coordinates of the second image based on first reference coordinates of the first image when the zoom factor of the output image is between the first reference value and the second reference value, and may output an image based on the second image when the zoom factor exceeds the second reference value.

19 Claims, 15 Drawing Sheets

(51) Int. Cl.

| | |
|---|---|
| *H04N 5/262* | (2006.01) |
| *G02B 13/02* | (2006.01) |
| *G02B 27/00* | (2006.01) |
| *G02B 13/04* | (2006.01) |
| *G02B 13/00* | (2006.01) |
| *G06K 9/00* | (2006.01) |
| *H04N 5/225* | (2006.01) |

(52) U.S. Cl.
CPC ......... *G02B 13/0015* (2013.01); *G02B 13/02* (2013.01); *G02B 13/04* (2013.01); *G02B 27/0025* (2013.01); *G02B 27/0075* (2013.01); *G06K 9/00228* (2013.01); *H04N 5/2258* (2013.01); *H04N 5/2259* (2013.01); *H04N 5/23232* (2013.01); *H04N 5/23241* (2013.01); *H04N 5/232127* (2018.08); *H04N 5/247* (2013.01); *H04N 5/2628* (2013.01)

(58) Field of Classification Search
CPC ............. H04N 5/2259; H04N 5/23212; H04N 5/23232; H04N 5/23241; H04N 5/23296; H04N 5/247; H04N 5/2628
See application file for complete search history.

(56) References Cited

U.S. PATENT DOCUMENTS

| | | | |
|---|---|---|---|
| 7,015,954 B1 * | 3/2006 | Foote | ..................... G06T 5/006 348/218.1 |
| 8,494,224 B2 | 7/2013 | Super et al. | |
| 8,649,558 B2 | 2/2014 | Gleicher et al. | |
| 8,971,625 B2 | 3/2015 | Pitts et al. | |
| 9,325,899 B1 | 4/2016 | Chou et al. | |
| 9,325,934 B2 | 4/2016 | Williams | |
| 9,998,663 B1 | 6/2018 | François et al. | |
| 2008/0030592 A1 * | 2/2008 | Border | ................... H04N 5/232 348/218.1 |
| 2008/0218611 A1 * | 9/2008 | Parulski | ............. H04N 5/23212 348/262 |
| 2010/0097443 A1 | 4/2010 | Lablans | |
| 2011/0058046 A1 * | 3/2011 | Yoshida | ............... G06K 9/00362 348/207.1 |
| 2012/0081579 A1 | 4/2012 | Doepke | |
| 2013/0114892 A1 * | 5/2013 | Vandame | ............... G06T 3/4053 382/162 |
| 2015/0116818 A1 | 4/2015 | Ando | |
| 2016/0050374 A1 | 2/2016 | Shabtay et al. | |
| 2016/0150211 A1 * | 5/2016 | Hwang | .................. H04N 13/15 348/43 |
| 2016/0241793 A1 * | 8/2016 | Ravirala | .......... H04N 5/232945 |
| 2017/0122771 A1 | 5/2017 | Keal et al. | |
| 2017/0178348 A1 | 6/2017 | Shen et al. | |

FOREIGN PATENT DOCUMENTS

| | | |
|---|---|---|
| CN | 105527702 A | 4/2016 |
| CN | 105657237 A | 6/2016 |
| WO | 2013/157658 A1 | 10/2013 |

* cited by examiner

FIG. 10
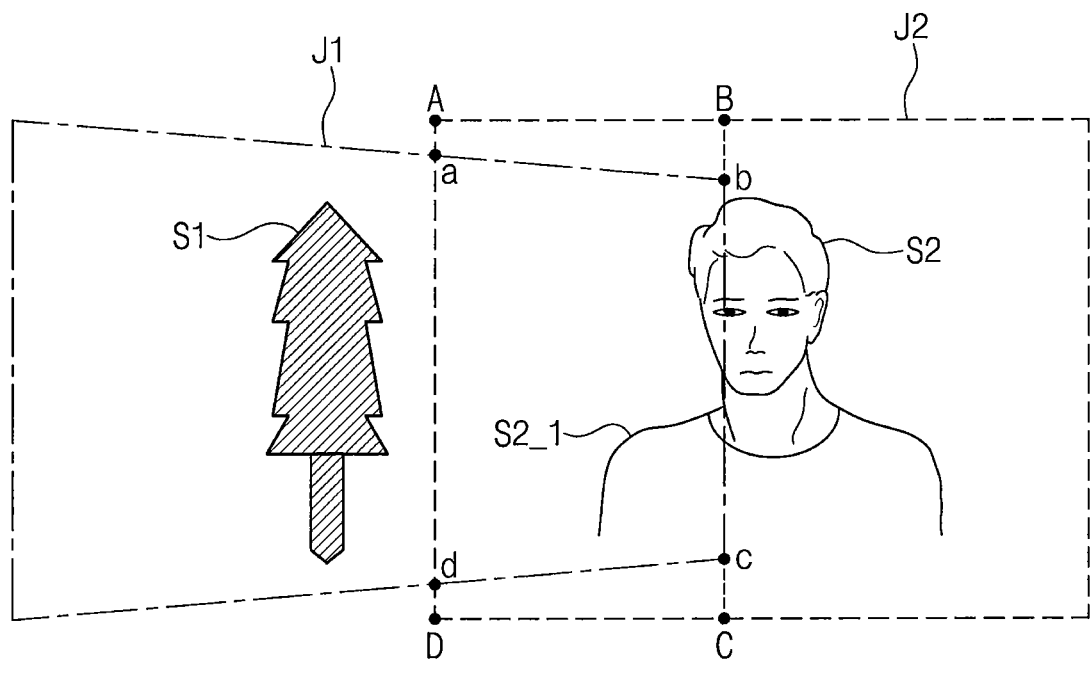
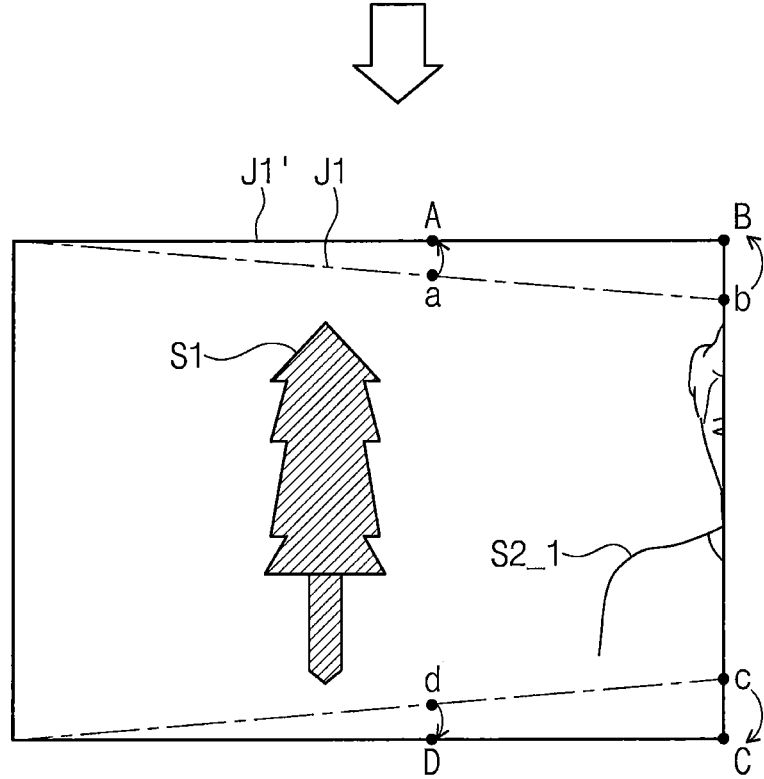

FIG. 11
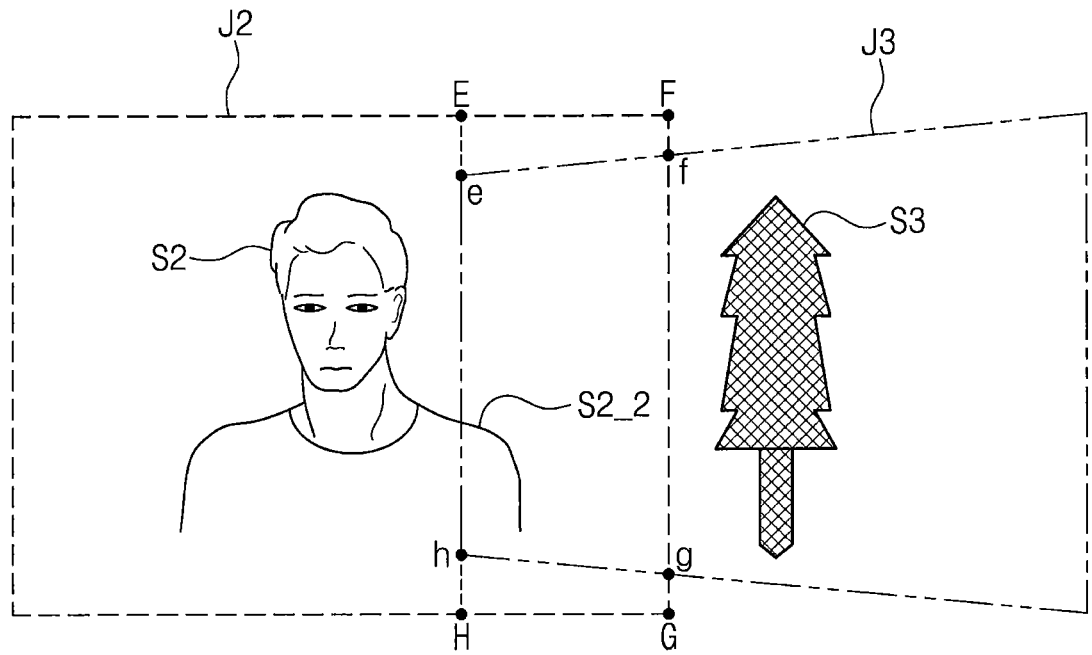
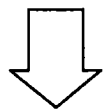
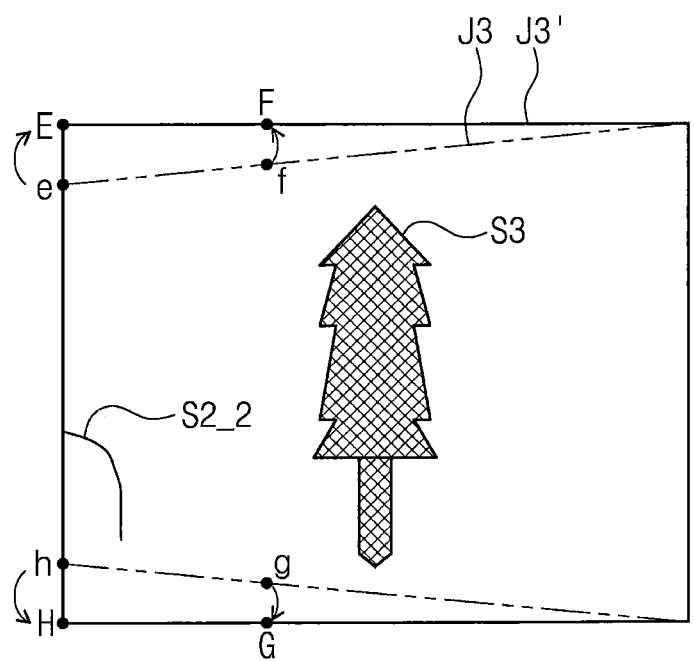

IMAGE PROCESSING SYSTEMS FOR CORRECTING PROCESSED IMAGES USING IMAGE SENSORS

CROSS-REFERENCE TO RELATED APPLICATIONS

This application is a continuation of U.S. patent application Ser. No. 15/692,159, filed Aug. 31, 2017, which itself claims priority under 35 U.S.C. § 119 to Korean Patent Application No. 10-2016-0128474 filed Oct. 5, 2016 in the Korean Intellectual Property Office, the entire contents of both of which are incorporated by reference herein in their entirety.

TECHNICAL FIELD

Embodiments of the inventive concepts relate to an electronic devices, and more particularly, to image processing systems and electronic devices including the same.

DESCRIPTION OF THE RELATED ART

Digital image capturing devices, such as a digital camera and a digital camcorder, may obtain images using an image sensor. A smartphone and/or a personal computer (PC) may obtain an image using an image sensor. An image sensor may include a charge coupled device (CCD) and/or a CMOS image sensor (CIS).

The image sensor may include a plurality of image sensor pixels. The image sensor pixels may be arranged in the form of an array. The image sensor pixels may output analog signals based on light incident thereon. The analog signals output from the image sensor pixels may be converted into digital signals and the digital signals may be stored as image data after being digitized.

SUMMARY

Some embodiments of the inventive concepts may provide image processing systems that may reduce electric energy consumed in a process of correcting images and electronic devices including the same.

According to some embodiments of the inventive concepts, image processing systems may be provided. An image processing system may include a first image sensor, a second image sensor, and an image processing device. The first image sensor may be configured to obtain first image data of a subject. The second image sensor may be configured to obtain second image data of all or part of the subject. The image processing device may be configured to perform operations including obtaining a first image and a second image by respectively processing the first image data and the second image data. The operations may including generating a correction image by correcting locations of second reference coordinates of the second image based on first reference coordinates of the first image, when a zoom factor is between a first reference value and a second reference value. The operations may include outputting an output image based on the second image when the zoom factor exceeds the second reference value, based on the correction image when the zoom factor is between the first reference value and the second reference value, and based on the first image when the zoom factor is less than the first reference value.

According to some embodiments of the inventive concepts, electronic devices may be provided. An electronic device may include a first image sensor, a second image sensor, and an image processing device. The first image sensor may be configured to obtain first image data of a subject. The second image sensor may be configured to obtain second image data of the subject. The image processing device may be configured to perform operations including obtaining a first image and a second image by respectively processing the first image data and the second image data. The operations may include outputting a correction image that is generated by correcting locations of second reference coordinates of the second image based on first reference coordinates of the first image during a first time, when the first image data is not received. The operations may include outputting an output image based on the second image after the first time without correcting the locations of second reference coordinates of the second image based on first reference coordinates of the first image.

According to some embodiments of the inventive concepts, image processing systems may be provided. An image processing system may include a first image sensor configured to obtain first image data of a subject and a second image sensor physically separated from the first image sensor by a distance. The second image sensor may be configured to obtain second image data of the subject. The image processing system may include a first image processor coupled to the first image sensor and configured produce a first image based on the first image data and a second image processor coupled to the second image sensor and configured produce a second image based on the second image data. The image processing system may include a correction circuit that may be configured to receive the first and second images and to produce a corrected image by transforming coordinates of the second image based on reference coordinates of the first image. The image processing system may include a controller that may be configured to control the image processing system to enable the correction circuit and output the corrected image as an output image in a first time and then to disable the correction circuit and output the second image as the output image in a second time.

BRIEF DESCRIPTION OF THE DRAWINGS

The inventive concepts will become more clearly understood in view of the detailed description and the accompanying drawings, wherein like reference numerals may refer to like parts throughout the various figures unless otherwise specified.

FIG. 10 is a conceptual flowchart diagram illustrating operations of methods in which the image processing system of FIG. 8 corrects a first image, according to some embodiments of the inventive concepts.

FIG. 11 is a conceptual flowchart diagram illustrating operations of methods in which the image processing system of FIG. 8 corrects a second image, according to some embodiments of the inventive concepts.

DETAILED DESCRIPTION

Figure 1:
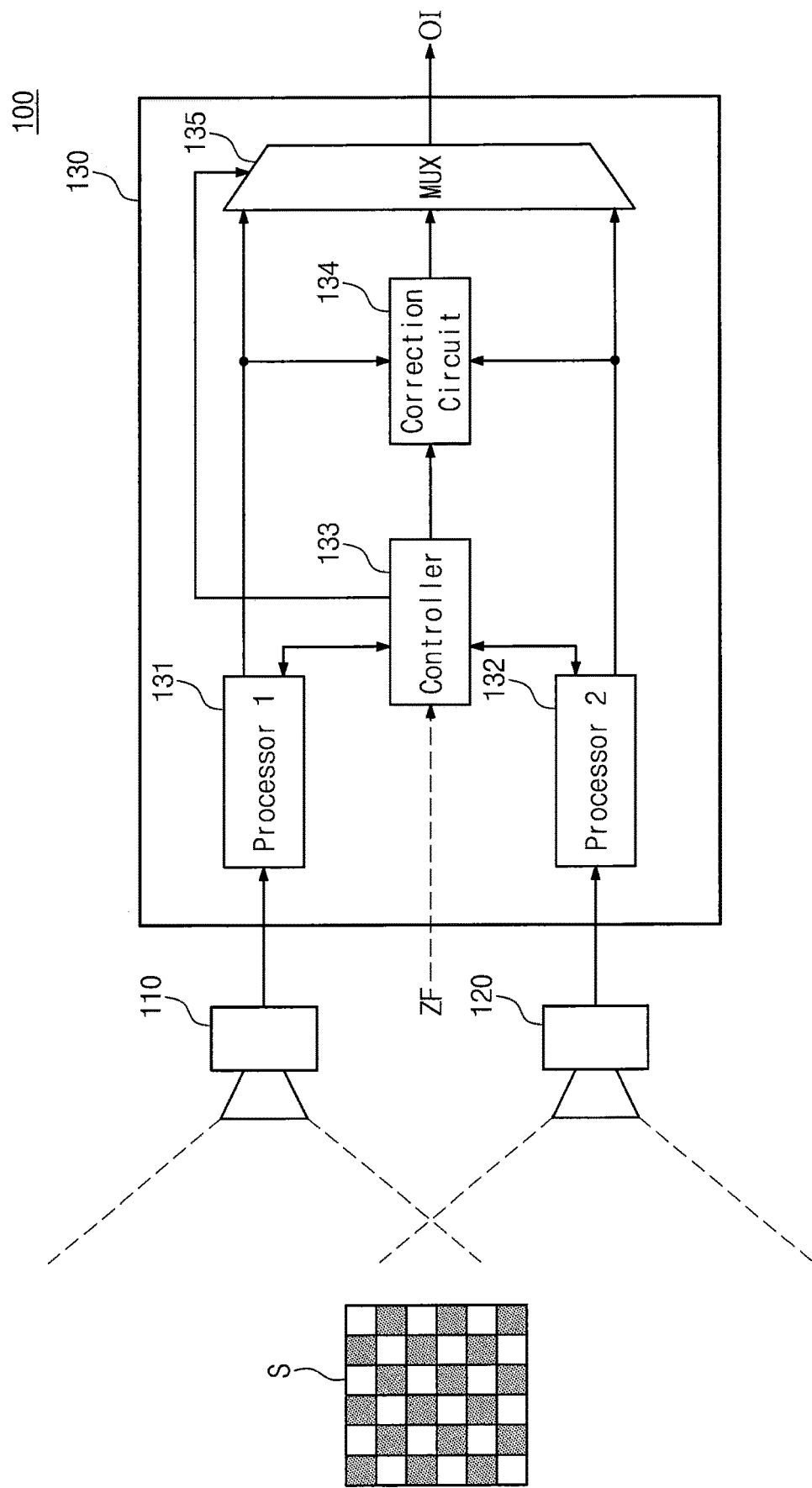
FIG. 1 is a block diagram illustrating an image processing system according to some embodiments of the inventive concepts.

The inventive concepts will now be described more fully hereinafter with reference to the accompanying drawings, in which exemplary embodiments of the inventive concepts are shown. The inventive concepts and methods of achieving them will be apparent from the following exemplary embodiments that will be described in more detail with reference to the accompanying drawings. The embodiments of the inventive concepts may, however, be embodied in different forms and should not be constructed as limited to the embodiments set forth herein. Rather, these embodiments are provided so that this disclosure will be thorough and complete, and will fully convey the scope of the inventive concepts to those skilled in the art.

As used herein, the singular terms "a," "an" and "the" are intended to include the plural forms as well, unless the context clearly indicates otherwise. It will be understood that when an element is referred to as being "connected" or "coupled" to another element, it may be directly connected or coupled to the other element or intervening elements may be present. As used herein, the term "and/or" includes any and all combinations of one or more of the associated listed items. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Similarly, it will be understood that when an element such as a layer, region or substrate is referred to as being "connected to" or "on" another element, it can be directly connected to or on the other element or intervening elements may be present. In contrast, the term "directly" means that there are no intervening elements. Additionally, embodiments that are described in the detailed description may be described with sectional views as ideal exemplary views of the inventive concepts. Accordingly, shapes of the exemplary views may be modified according to manufacturing techniques and/or allowable errors. Therefore, the embodiments of the inventive concepts are not limited to the specific shape illustrated in the exemplary views, but may include other shapes that may be created according to manufacturing processes.

Embodiments of the present inventive concepts explained and illustrated herein may include their complementary counterparts. The same reference numerals or the same reference designators denote the same elements throughout the specification.

FIG. 1 is a block diagram illustrating an image processing system, according to some embodiments of the inventive concepts. An image processing system 100 may be included in various electronic devices. For example, the image processing system 100 may be included in at least one of a personal computer, a desktop, a tablet computer, a digital camera, a camcorder, a smartphone, a mobile device, and/or a wearable device.

Referring to FIG. 1, the image processing system 100 may include a first image sensor 110, a second image sensor 120, and an image processing device 130.

The first image sensor 110 may photograph all or part of a subject S. The first image sensor 110 may generate the captured result as first image data. The second image sensor 120 may photograph all or part of the subject S. The second image sensor 120 may generate the captured result as second image data. The first and second image sensors 110 and 120 may transmit the first and second image data to the image processing device 130. Operations of the first and second image sensors 110 and 120 may be controlled by the image processing device 130.

For example, each of the first and second image sensors 110 and 120 may be implemented with one of a CCD sensor or a complementary metal-oxide semiconductor (CMOS) sensor. A respective plurality of photodiode elements may be integrated in each of the first and second image sensors 110 and 120. When light is incident on the first and second images sensors 110 and 120, ones of the photodiode elements may generate electrons based on the amount of incident light. The first and second image sensors 110 and 120 may respectively generate the first and second image data based on the amounts of electrons thus generated. The image processing system 100 illustrated in FIG. 1 includes two image sensors 110 and 120. However, embodiments of the inventive concepts may not be limited thereto. For example, the image processing system 100 may include three or more image sensors.

The image processing device 130 may include a first processor 131, a second processor 132, a controller 133, a correction circuit 134, and a multiplexer 135.

According to some embodiments of the inventive concepts, the image processing system 100 may include the first and second processors 131 and 132. The first and second processors 131 and 132 may respectively process the first and second image data captured by the first and second image sensors 110 and 120. The first and second image data captured by the first and second image sensors 110 and 120 may be different from each other.

The first processor 131 may receive the first image data from the first image sensor 110. For example, the first processor 131 may correct the first image data in units of a frame. In more detail, the first processor 131 may eliminate noise included in the first image data. To prevent image distortion generated when the first image data is output to a display device, the first processor 131 may compensate for a distortion value in the first image data in advance. The first processor 131 may correct a white balance of the first image data. The first processor 131 may generate an output image by adjusting the size of an area of the first image data.

The first processor 131 may control an operation of the first image sensor 110. For example, the first processor 131 may control an open or close operation of a shutter included in the first image sensor 110. In more detail, the first processor 131 may open the shutter of the first image sensor 110 until a brightness value of a subject image reaches a reference value. The first processor 131 may control a location of a first lens to adjust a focus between the first image sensor 110 and the subject S.

A first image may be generated based on the first image data corrected by the first processor 131. The first processor 131 may transmit the first image to the controller 133, the correction circuit 134, and the multiplexer 135. An operation of the first processor 131 may be controlled by the controller 133.

The second processor 132 may receive the second image data from the second image sensor 120. The second processor 132 may control an operation of the second image sensor 120. The second processor 132 may correct the second image data. A second image may be generated based on the second image data corrected by the second processor 132. The second processor 132 may transmit the second image to the controller 133, the correction circuit 134, and the multiplexer 135. An operation of the second processor 132 may be similar to or the same as an operation of the first processor 131. A detailed description on an operating method of the second processor 132 may be thus omitted for brevity.

The controller 133 may control overall operations of the image processing device 130. For example, the controller 133 may individually control the operations of the first processor 131 and the second processor 132. The controller 133 may receive the first image from the first processor 131 and the second image from the second processor 132. For example, the controller 133 may sense (or detect) the degree of focusing of each of the first and second image sensors 110 and 120 or movement of the image processing system 100. Alternatively, the controller 133 may sense information about a zoom factor ZF of an output image OI.

The controller 133 may control an operation of the correction circuit 134 based on the sensing result. The controller 133 may control a warping correction of an image performed by the correction circuit 134. The warping correction may include transforming a shape of an image into another shape. In more detail, the warping correction may include transforming coordinates of each pixel included in an image into reference coordinates. Respective coordinates may be transformed according to a location transform rule. For example, the location transform rule may use a homography or remapping manner. Coordinates of the pixels included in the image may be transformed into the reference coordinates by using the location transform rule.

The degree of warping correction may be determined by a correction coefficient value used upon performing remapping or by a matrix used for a homography operation. For example, the degree of warping correction may increase as the correction coefficient value increases and the degree of warping correction may decrease as the correction coefficient value becomes closer to "1". Alternatively, the degree of warping correction may be adjusted by changing ranks of a matrix and the warping correction may not be performed when the matrix corresponds to an identity matrix.

The controller 133 may control the correction circuit 134 such that the warping correction may be made on an overlapped area between the first image and the second image. The controller 133 may control the correction circuit 134 to perform the warping correction on the second image based on the first image. Alternatively, the controller 133 may control the correction circuit 134 to perform the warping correction on the first image based on the second image.

The controller 133 may extract first reference coordinates from coordinates of pixels of the first image and may extract second reference coordinates from coordinates of pixels of the second image.

According to some embodiments of the inventive concepts, the controller 133 may control a time when the warping correction is made in the correction circuit 134. For example, the controller 133 may include a timer for controlling a time to make warping correction. Under control of the controller 133, the warping correction may be made during a reference time in the correction circuit 134. The controller 133 may stop an operation of the correction circuit 134 when the reference time elapses.

In some embodiments, the controller 133 may count the number of frames of each of the first and second images. The controller 133 may include a counter circuit to count the number of frames of each of the first and second images.

For example, the controller 133 may count the number of frames of each of the first and second images from a point in time when the warping correction of the correction circuit 134 starts. Under control of the controller 133, the correction circuit 134 may perform the warping correction until the number of frames of each of the first and second images reaches a reference count. The controller 133 may stop an operation of the correction circuit 134 when the number of frames of each of the first and second images reaches the reference count.

The correction circuit 134 may receive the first image from the first processor 131 and the second image from the second processor 132. An operation of the correction circuit 134 may be controlled by the controller 133.

The correction circuit 134 may receive information about the first reference coordinates included in the first image and the second reference coordinates included in the second image from the controller 133. The correction circuit 134 may perform the warping correction on the first image and the second image by using the first reference coordinates and the second reference coordinates.

When the correction circuit 134 performs the warping correction on an overlapped area between the first image and the second image, the correction circuit 134 may set one of the first image and the second image as a reference image. For example, the first image may be the reference image. The correction circuit 134 may extract reference coordinates from an area of the first image that is overlapped with the second image and may extract reference coordinates from a corresponding area of the second image that is overlapped with the first image. The correction circuit 134 may correct locations of the reference coordinates of the second image based on the reference coordinates of the first image.

When the correction circuit 134 makes the warping correction on the second image by using the first image, the correction circuit 134 may correct locations of the second reference coordinates of the second image based on the first reference coordinates of the first image. When the correction circuit 134 makes the warping correction on the first image by using the second image, the correction circuit 134 may correct locations of the first reference coordinates of the first image based on the second reference coordinates of the second image. The correction circuit 134 may perform the warping correction during the reference time. The correction circuit 134 may provide the multiplexer 135 with a correction image generated through the warping correction.

The multiplexer 135 may receive the first image from the first processor 131 and the second image from the second processor 132. The multiplexer 135 may receive a corrected image from the correction circuit 134. An operation of the multiplexer 135 may be controlled by the controller 133. The multiplexer 135, under control of the controller 133, may select one of the first image, the second image, and the correction image as the output image OI. The image processing system 100 may provide a user of the electronic device with the output image OI through a display of the electronic device. Alternatively, the image processing system 100 may transmit the output image OI to another electronic device.

The warping correction may be necessary to generate an output image based on images generated by the plurality of image sensors 110 and 120. However, when the image processing system 100 performs the warping correction for a long time, the image processing system 100 may consume a lot of power in an operation process for the warping correction. According to some embodiments of the inventive concepts, the image processing system 100 may perform the warping correction only during the reference time and may generate an output image without performing the warping correction if the reference time elapses. According to some embodiments of the inventive concepts, the image processing system 100 may reduce power consumption by shortening a warping correction time.

Figure 2:
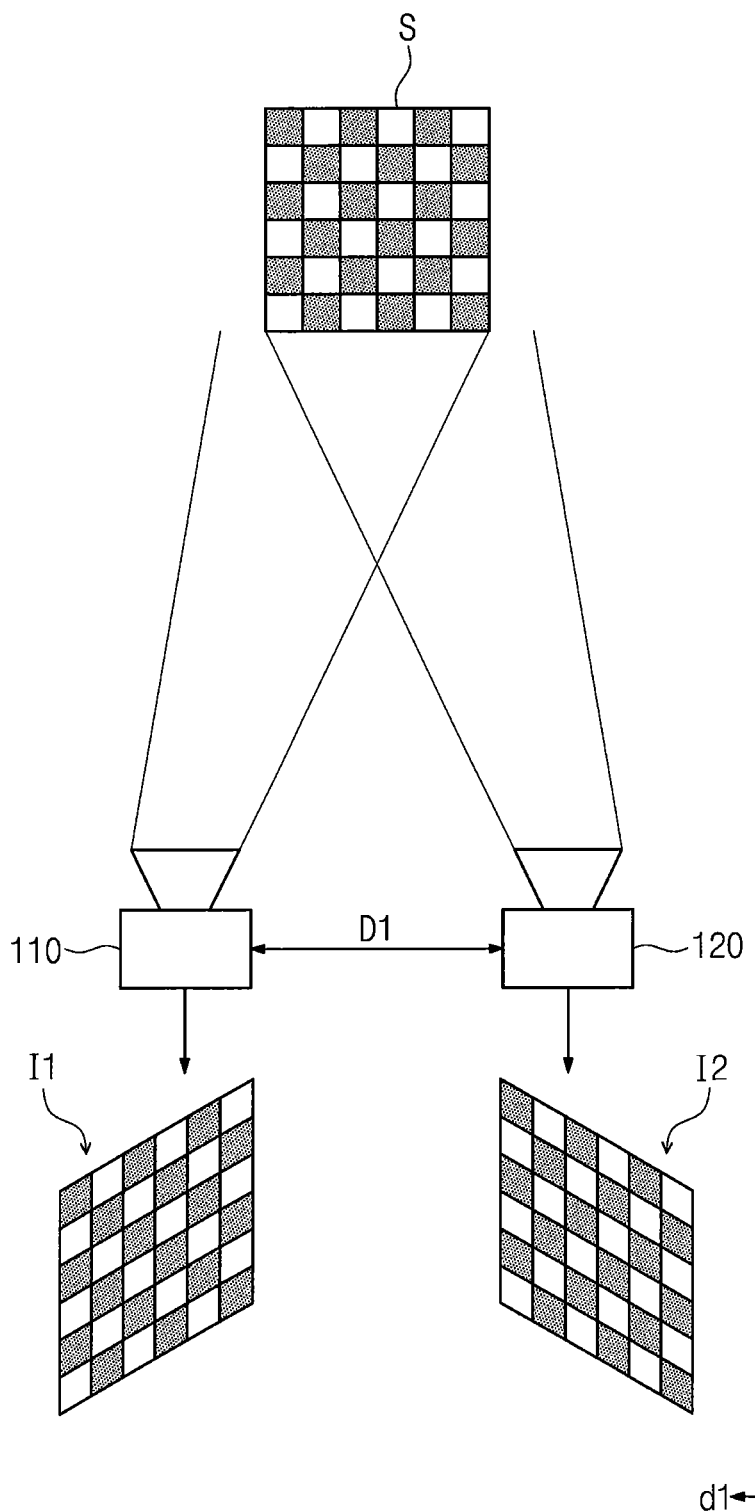
FIG. 2 is a conceptual block diagram illustrating operations of methods in which a subject is photographed by first and second image sensors, according to some embodiments of the inventive concepts.

FIG. 2 is a conceptual block diagram illustrating operations of methods in which a subject is photographed by first and second image sensors, according to some embodiments of the inventive concepts. Referring to FIGS. 1 and 2, each of the first image sensor 110 and the second image sensor 120 may photograph the subject S. The first image sensor 110 may be situated in a first direction d1, and the second image sensor 120 may be situated in a second direction d2 that is opposite to the first direction d1. The first image sensor 110 and the second image sensor 120 may be spaced apart from each other by a first distance D1.

Due to the physical distance D1 between the first image sensor 110 and the second image sensor 120, the first image sensor 110 and the second image sensor 120 may photograph the subject S at different angles. For example, a first image I1 photographed by the first image sensor 110 may include the subject S viewed from the first direction d1. A second image I2 photographed by the second image sensor 120 may include the subject S viewed from the second direction d2. Accordingly, a location of the subject S included in the first image I1 may be different from a location of the subject S included in the second image I2.

Figure 3:
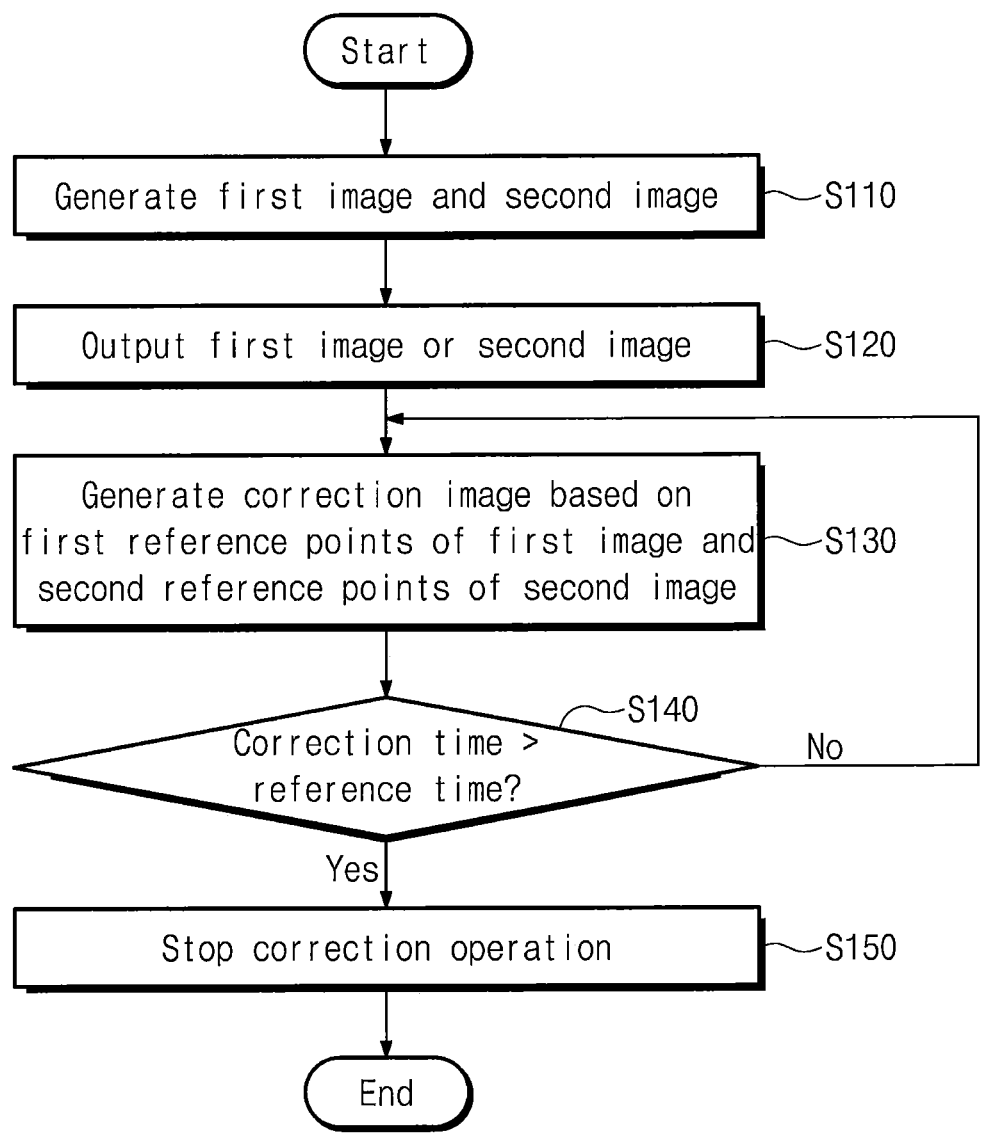
FIG. 3 is a flowchart illustrating operations of methods of operating the image processing system of FIG. 1, according to some embodiments of the inventive concepts.

FIG. 3 is a flowchart illustrating operations of methods of operating the image processing system of FIG. 1, according to some embodiments of the inventive concepts. Referring to FIGS. 1 to 3, in an operation S110, the image processing system 100 may generate a first image and a second image. For example, the first image described with reference to FIG. 1 may be the same as the first image I1 illustrated in FIG. 2, and the second image described with reference to FIG. 1 may be the same as the second image I2 illustrated in FIG. 2. In an operation S120, the image processing system 100 may select the first image or the second image as an output image.

In an operation S130, the image processing system 100 may generate a correction image based on first reference coordinates of the first image and second reference coordinates of the second image. For example, the first reference coordinates of the first image may be set based on coordinates of pixels of the first image, and the second reference coordinates of the second image may be set based on coordinates of pixels of the second image. The correction circuit 134 may set one of the first and second images as a reference image and may correct locations of reference coordinates of another image based on reference coordinates of the reference image.

In an operation S140, the image processing system 100 may determine whether a correction time exceeds a reference time. If the correction time does not exceed the reference time (No), the process may proceed to operation S130 to perform the process of generating the correction image again. If the correction time exceeds the reference time (Yes), in an operation S150, the image processing system 100 may stop the warping correction. For example, the image processing system 100 may reduce a conversion coefficient value needed for the warping correction while performing the warping correction.

Figure 4:
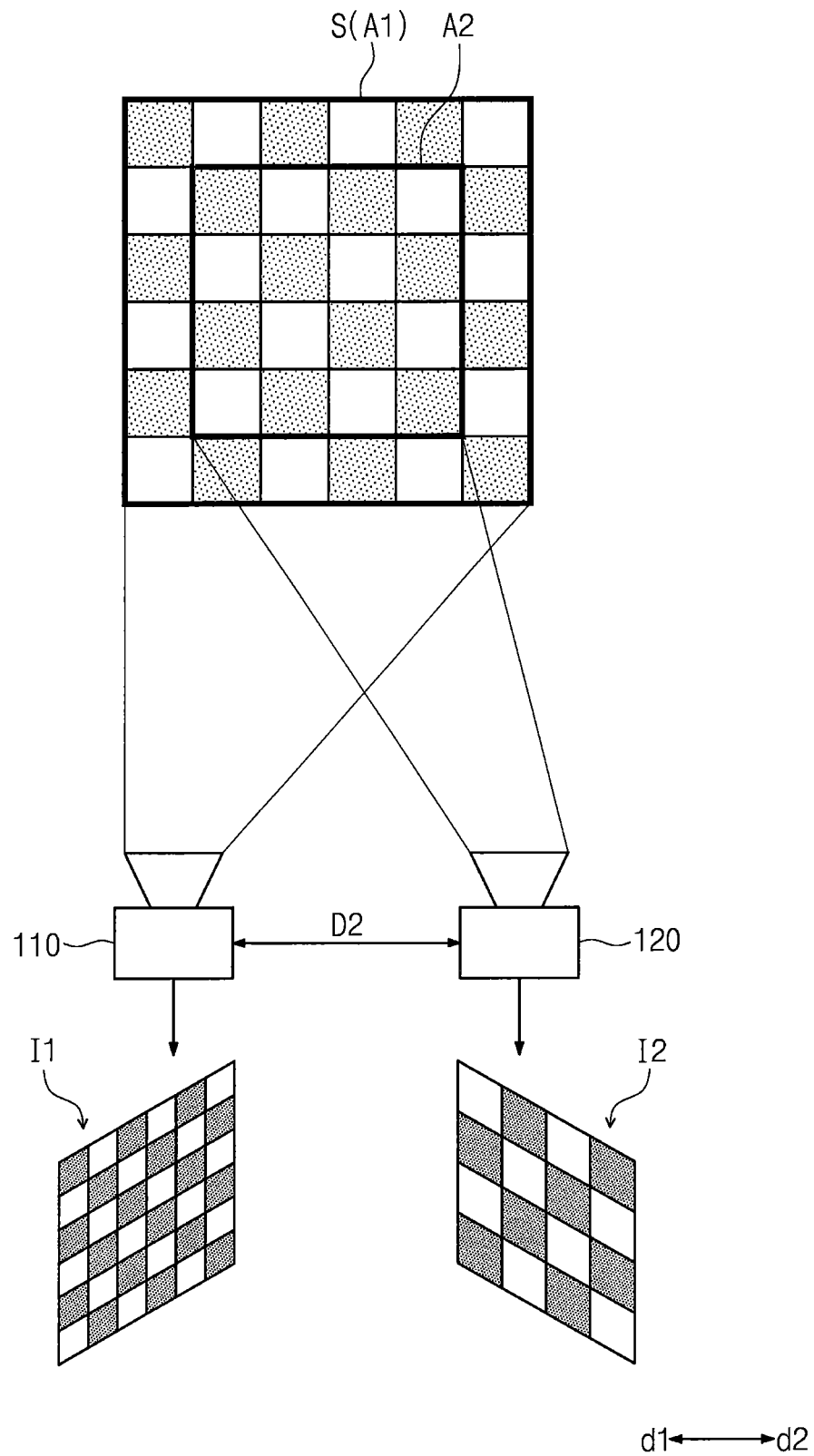
FIG. 4 is a conceptual block diagram illustrating operations of methods in which a subject is photographed by first and second image sensors, according to some embodiments of the inventive concepts.

FIG. 4 is a conceptual block diagram illustrating operations of methods in which a subject is photographed by first and second image sensors, according to some embodiments of the inventive concepts. Referring to FIGS. 1 and 4, in some embodiments, the first image sensor 110 may photograph the subject S by using a wide angle lens. The wide angle lens may have a wide angle of view. For example, an angle of view of a general lens may be from about 44° to about 50°, and an angle of view of the wide angle lens may be from about 60° to about 80°. However, embodiments of the inventive concepts are not limited thereto. For example, in some embodiments, the angle of view of the wide angle lens may be wider than 80°. The first image sensor 110 may photograph a first area A1 of the subject S. For example, the first area A1 may be the same as the whole area of the subject S, however embodiments of the inventive concepts are not limited thereto.

In some embodiments, the second image sensor 120 may photograph the subject S by using a telephoto lens. The telephoto lens may have an angle of view narrower than that of the wide angle lens. For example, in some embodiments, the angle of view of the telephoto lens may be less than 15°, however embodiments of the inventive concepts are not limited thereto. Accordingly, the second image sensor 120 may photograph a second area A2 of the subject S. The second area A2 may be a portion of the whole area of the subject S. The second area A2 may be smaller than the first area A1.

The first image sensor 110 may be situated in the first direction d1, and the second image sensor 120 may be situated in the second direction d2 that is opposite to the first direction d1. The first image sensor 110 and the second image sensor 120 may be spaced apart from each other by a second distance D2.

Due to the physical distance D2 between the first image sensor 110 and the second image sensor 120, the first image sensor 110 and the second image sensor 120 may photograph the subject S at different angles. The first image sensor 110 may generate subject S of the first area A1 viewed from the first direction d1 as the first image I1. The second image sensor 120 may generate subject of the second area A2 viewed from the second direction D2 as the second image I2.

Image sensors 110 and 120 having different angles of view may be used in the image processing system 100 may provide a clear image consistently when a zoom factor of a subject included in an output image is changed. A method in which the image processing system 100 generates an output image when a zoom factor of a subject included in the output image is changed will be more fully described with reference to FIGS. 5 to 7.

Figure 5:
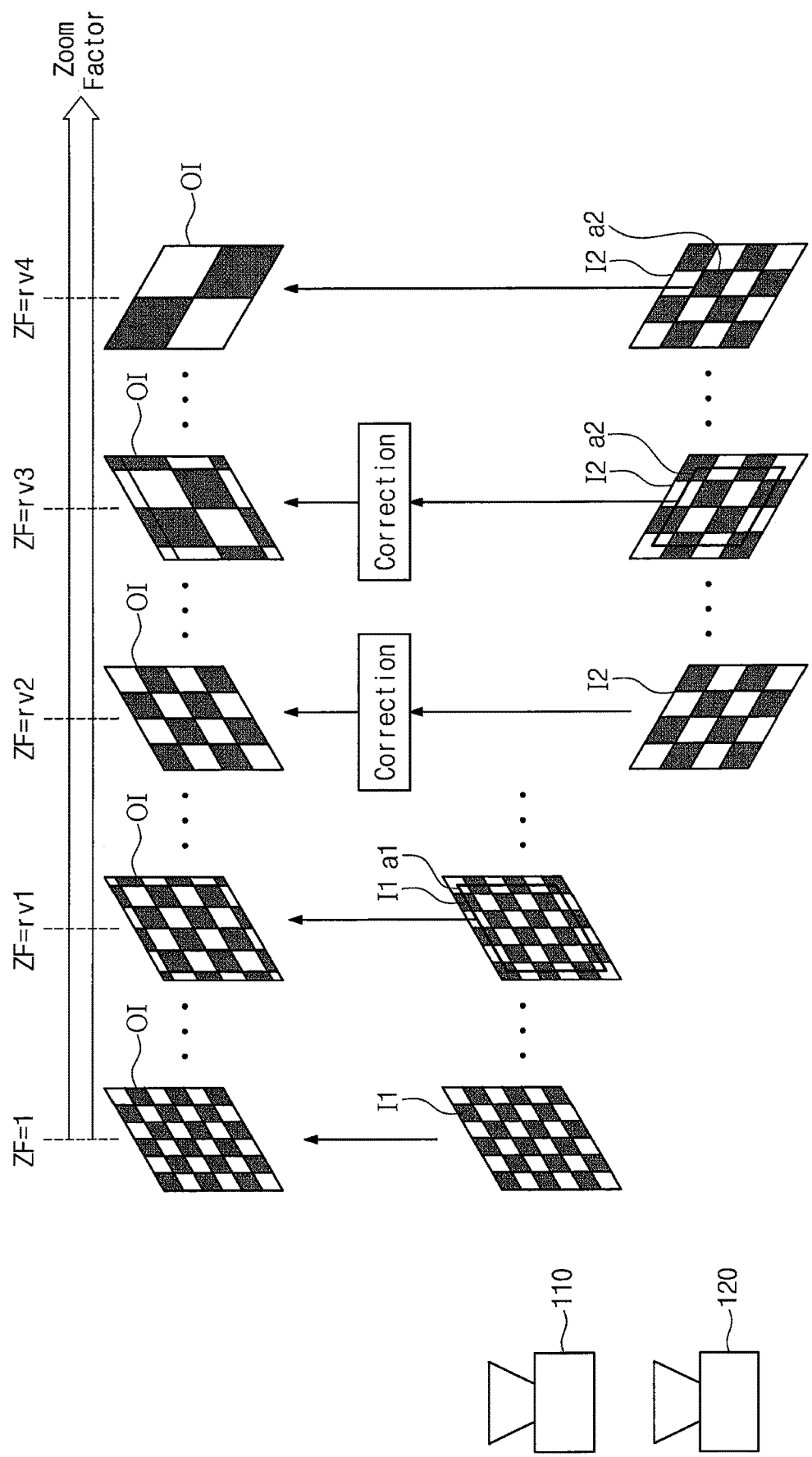
FIG. 5 is a conceptual block diagram illustrating operations of methods of generating an output image at the image processing system of FIG. 1 when a zoom factor of a subject included in the output image increases, according to some embodiments of the inventive concepts.

FIG. 5 is a conceptual block diagram illustrating operations of methods of generating an output image at the image processing system of FIG. 1 when a zoom factor of a subject included in the output image increases, according to some embodiments of the inventive concepts. Referring to FIG. 5, the size of a subject included in the output image OI may become enlarged (or zoomed in) as the zoom factor ZF increases. Even though the zoom factor ZF increases, the size of the output image may be maintained without change.

Referring to FIGS. 1, 4, and 5, the controller 133 may obtain information about the zoom factor ZF. When the zoom factor ZF is "1", the first image I1 photographed by the first image sensor 110 may be outputted as the output image OI. For example, the controller 133 may activate the first image sensor 110 and may deactivate the second image sensor 120. When the first image sensor 110 is activated, the first image sensor 110 may photograph the subject S. When the second image sensor 120 is deactivated, the second image sensor 120 may not photograph the subject S. Alternatively, the first and second image sensors may each photograph the subject S, and the controller 133 may control the multiplexer 135 to output the first image I1 as the output image OI.

A subject included in the first image I1 may be enlarged in proportion to an increase of the zoom factor ZF of the output image OI. For example, the controller 133 may control the first processor 131 to enlarge the subject. The first processor 131 may enlarge the subject included in the first image I1 based on the zoom factor ZF. The first processor 131 may enlarge a first image area a1 of the first image I1 when the zoom factor ZF reaches a first reference value rv1. For example, the first processor 131 may enlarge the first image area a1 to be the same as the size of the output image OI. The enlarged first image area a1 may be generated as the output image OI. The size of the first image area a1 of the first image I1 may become smaller as the zoom factor ZF approximates to a second reference value rv2.

When the zoom factor ZF reaches the second reference value rv2, the output image OI may be generated based on the second image I2 photographed by the second image sensor 120 instead of the first image I1 photographed by the first image sensor 110. For example, the controller 133 may deactivate the first image sensor 110 and may activate the second image sensor 120. The first image sensor 110 may not photograph the subject S when the first image sensor 110 is deactivated. The second image sensor 120 may photograph the subject S when the second image sensor 120 is activated.

When the zoom factor ZF reaches the second reference value rv2, an image of the enlarged second area A2 of the second image sensor 120 may be generated as the output image OI. A quality of the output image OI may be worse when the output image OI is generated based on an enlarged subject of the first image I1, as compared to when the output image OI is generated based on the enlarged subject of the second image I2, when the zoom factor ZF reaches the second reference value rv2. In other words, when the zoom factor becomes large enough that the area to be enlarged is the same as or smaller than the area A2 of the second image sensor 120, the quality of the output may be improved by generating the output image OI based on the second image sensor 120 that has a narrower angle of view than the first image sensor 120. Accordingly, when the zoom factor ZF reaches the second reference value rv2, the image processing device 130 may generate the output image OI by using the second image I2 instead of the first image I1. Alternatively, the first and second image sensors 110 and 120 may photograph the subject S, and the controller 133 may control the correction circuit 134 to generate the output image OI based on the second image I2.

Referring to FIGS. 4 and 5, a direction to photograph the first area A1 of the first image sensor 110 may be different from a direction to photograph the second area A2 of the second image sensor 120. Accordingly, a location of a subject included in the output image OI may be changed if the second image I2 photographed by the second image sensor 120 is directly output as the output image OI. To prevent a change in a location of the subject, the correction circuit 134 may perform the warping correction on the second image I2.

In more detail, the controller 133 may allow the correction circuit 134 to perform the warping correction when the zoom factor ZF reaches the second reference value rv2. The controller 133 may provide the correction circuit 134 with information about first reference coordinates of the first image and second reference coordinates of the second image. The correction circuit 134 may correct locations of the second reference coordinates of the second image I2 based on the first reference coordinates of the first image I1. With the above-described process, a location of a subject in the output image OI may not be changed even though the subject is enlarged in proportion to an increase of the zoom factor ZF. In this case, electric energy consumed by the image processing system 100 may increase.

The second processor 132 may enlarge a subject included in the second image I2 based on the zoom factor ZF. The second processor 132 may enlarge a second image area a2 of the second image I2 when the zoom factor ZF reaches a third reference value rv3. For example, the second processor 132 may enlarge the second image area a2 to be the same as the size of the output image OI.

The correction circuit 134 may correct locations of reference coordinates of the second image area a2 based on the reference coordinates of the first image I1. The corrected second image area a2 may be generated as the output image OI. With the above-described process, a location of a subject in the output image OI may not be changed even though the subject is enlarged. The size of the second image area a2 of the second image I2 may become smaller as the zoom factor ZF approximates to a fourth reference value rv4. The degree of warping correction may decrease as the zoom factor ZF approximates to the fourth reference value rv4 from the second reference value rv2. For example, a correction coefficient value needed for the warping correction may approximate to "1", or a matrix may become an identity matrix.

The second processor 132 may enlarge a subject included in the second image area a2 of the second image I2 when the zoom factor ZF reaches the fourth reference value rv4. For example, the second processor 132 may enlarge the second image area a2 to be the same as the size of the output image OI. The correction circuit 134 may not perform the warping correction on the enlarged second image area a2. The enlarged second image area a2 may be output as the output image OI. With the above-described process, a location of a subject in the output image OI may be changed. To correct the location change, the correction circuit 134 may perform translation correction or crop correction on the second image area a2. Electric energy consumed by the image processing system 100 may decrease.

A kind of an image sensor that photographs a subject may be changed when the zoom factor ZF of the subject included in the output image OI increases. The image processing system 100 may perform the warping correction on the images I1 and I2 when a kind of an image sensor that photographs a subject is changed. However, in the case where the image processing system 100 performs the warping correction for a long time, the image processing system 100 may consume a lot of power. To reduce power consumption, according to some embodiments of the inventive concepts, the image processing system 100 may not perform the warping correction when the zoom factor ZF reaches a reference value. Accordingly, the power efficiency of the image processing system 100 may be improved.

In other words, as the zoom factor increases, when the zoom factor becomes equal to the second reference value rv2, the image processing system 100 may change from generating the output image OI based on the first image I1 to the second image I2 for improved quality because of the narrower angle of view of the second image sensor 120. However, when the zoom factor becomes equal to the second reference value rv2 and the output image OI is generated based on the second image I2, the correction circuit 134 may perform the warping correction on the second image I2. As the zoom factor increases further to approach the third reference value rv3, the degree of warping correction may decrease. As the zoom factor increases further to approach the fourth reference value rv4, the warping correction may cease.

Figure 6:
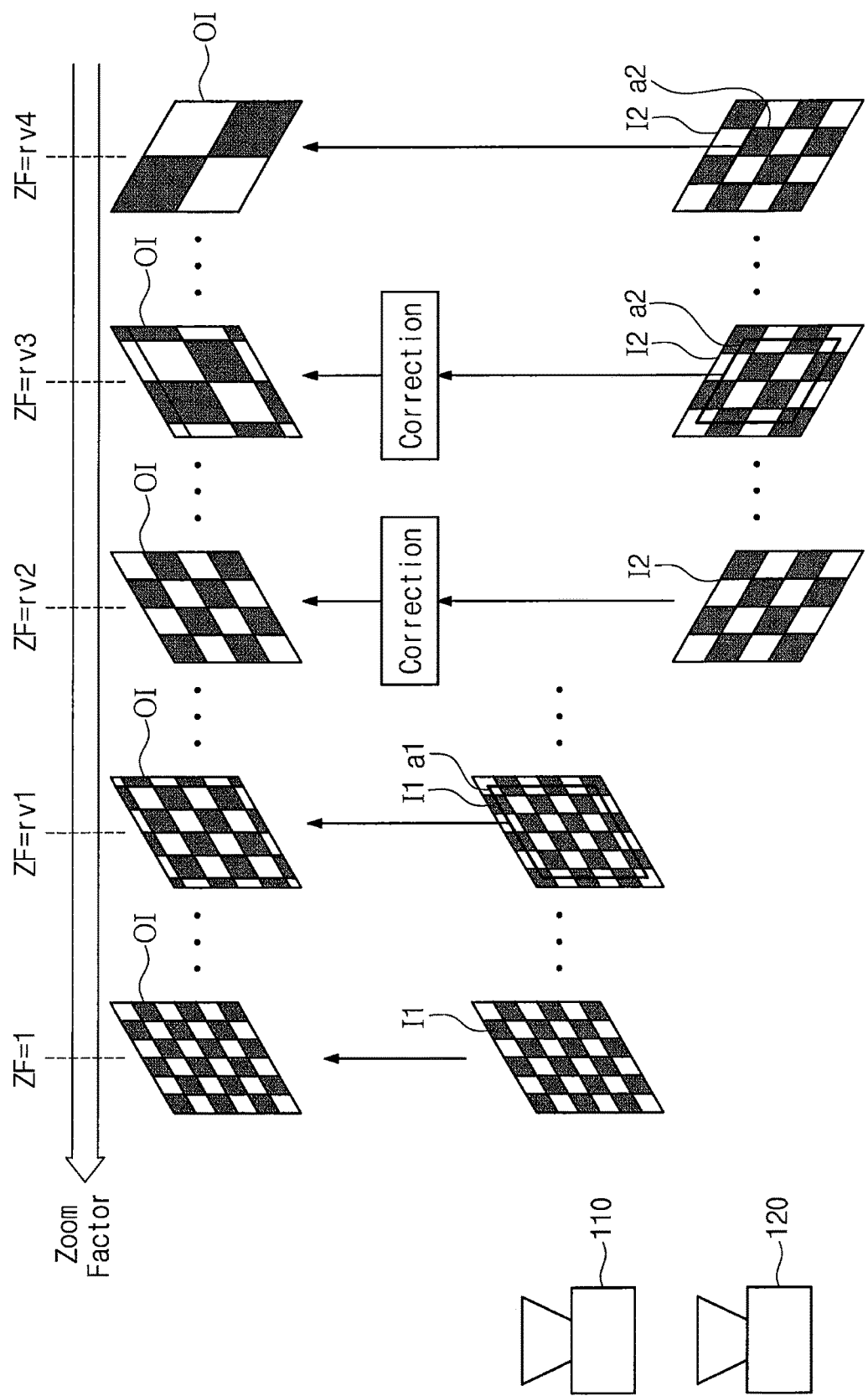
FIG. 6 is a conceptual block diagram illustrating operations of methods of generating an output image at the image processing system of FIG. 1 when a zoom factor of a subject included in the output image decreases, according to some embodiments of the inventive concepts.

FIG. 6 is a conceptual block diagram illustrating operations of methods of generating an output image at the image processing system of FIG. 1 when a zoom factor of a subject included in the output image decreases, according to some embodiments of the inventive concepts. A value of the zoom factor ZF may decrease when a size of a subject included in the output image OI is reduced (or zoomed out).

Referring to FIGS. 1, 4, and 6, when the zoom factor ZF is equal to the fourth reference value rv4, the second processor 132 of the image processing device 130 may generate the output image OI based on the second image area a2 of the second image I2. For example, the second processor 132 may enlarge the second image area a2 to be the same as the size of the output image OI. The enlarged second image area a2 may be output as the output image OI.

In the second image I2, the size of the second image area a2 may become larger as the zoom factor ZF becomes smaller than the fourth reference value rv4. For example, as the zoom factor ZF approximates to the third reference value rv3, the size of the second image area a2 may become larger, and a magnification of the second image area a2 may become smaller. The second processor 132 may enlarge the second image area a2 to be the same as the size of the output image OI.

The correction circuit 134 may correct locations of reference coordinates of the enlarged second image area a2 based on the reference coordinates of the first image I1. The corrected second image area a2 may be generated as the output image OI. With the above-described process, a location of a subject in the output image OI may be changed.

The second image area a2 may become larger as the zoom factor ZF approximates to the second reference value rv2. When the zoom factor ZF reaches the second reference value rv2, the size of the second image area a2 may become the same as the size of the second image I2 photographed by the second image sensor 120. The second processor 132 may not enlarge the second image I2 any more. The correction circuit 134 may correct locations of reference coordinates of the second image area I2 based on the reference coordinates of the first image I1. The corrected second image I2 may be generated as the output image OI.

When the zoom factor ZF becomes smaller than the second reference value rv2, the output image OI may be generated based on the first image I1 photographed by the first image sensor 110 instead of the second image I2 photographed by the second image sensor 120. The first processor 131 may enlarge a subject included in the first image area a1 of the first image I1 when the zoom factor ZF reaches the first reference value rv1. For example, the first processor 131 may enlarge the first image area a1 to be the same as the size of the output image OI. The enlarged first image area a1 may be generated as the output image OI. The size of the first image area a1 of the first image I1 may become larger as the zoom factor ZF approximates to "1". Lastly, when the zoom factor ZF is "1", the first image I1 photographed by the first image sensor 110 may be generated as the output image OI.

In other words, when the zoom factor is equal to the fourth reference value rv4 the image processing system 100 may generate the output image OI based on the second image I2 without warping correction. As the zoom factor decreases to approach the third reference value rv3, the image processing system 100 may generate the output image OI based on the second image I2 with warping correction. As the zoom factor decreases further to become smaller than the second reference value rv2, the image processing system 100 may change from generating the output image OI based on the second image I2 to the first image I1 and the warping correction may cease.

Figure 7:
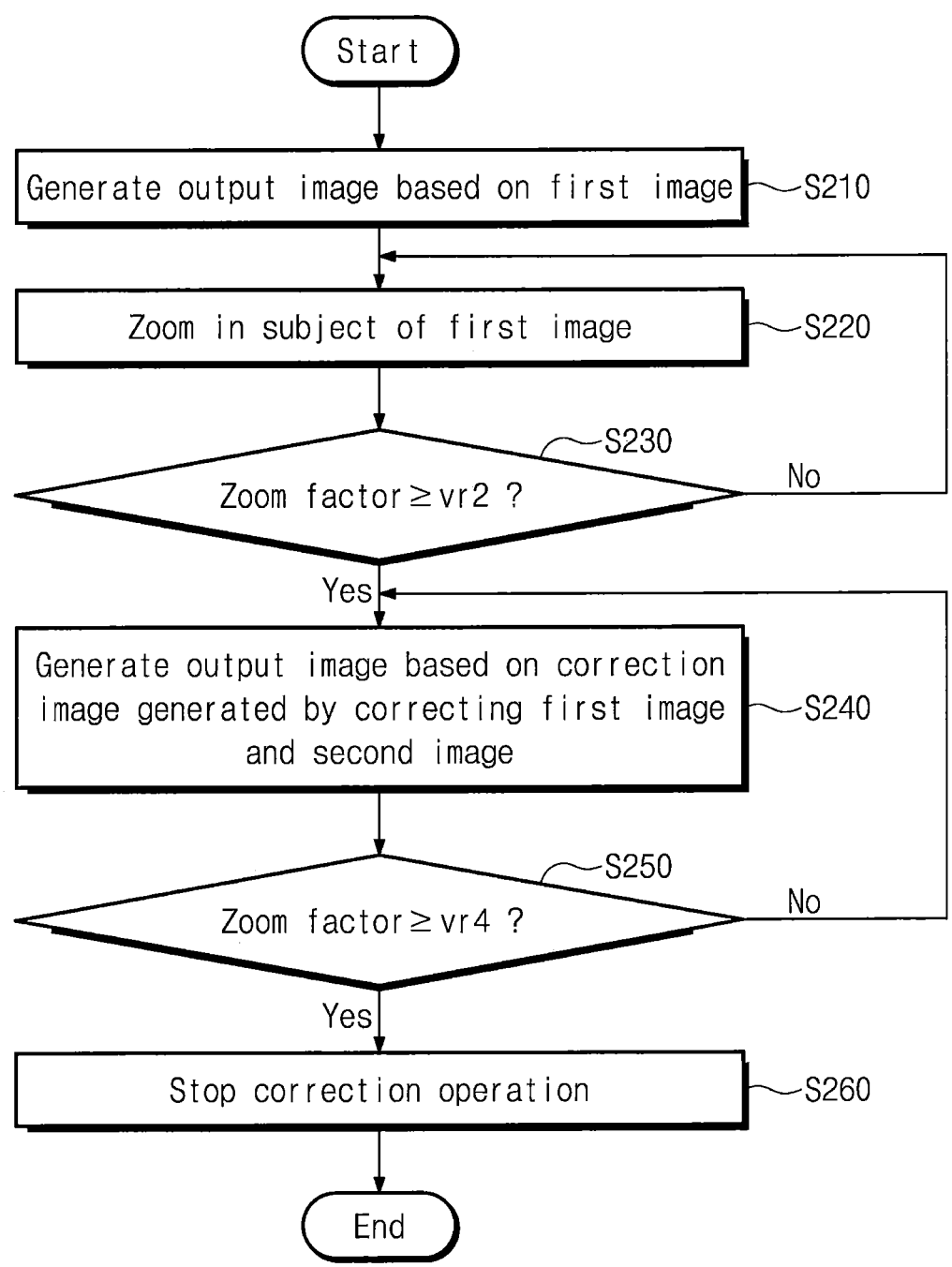
FIG. 7 is a flowchart illustrating operations of methods of enlarging a subject included in an image at the image processing system of FIG. 1, according to some embodiments of the inventive concepts.

FIG. 7 is a flowchart illustrating operations of methods of enlarging a subject included in an image at the image processing system of FIG. 1, according to some embodiments of the inventive concepts. Referring to FIGS. 1, 4, 5, and 7, in an operation S210, the image processing system 100 may generate the output image OI based on the first image I1. In an operation S220, a subject included in the first image I1 may be enlarged. The zoom factor ZF may become greater as the subject of the first image I1 is enlarged.

In an operation S230, the image processing system 100 may determine whether the zoom factor ZF is not less than the second reference value rv2. If the zoom factor ZF is less than the second reference value rv2 (No), the process may proceed back to the operation S220 to repeat the process of enlarging the subject of the first image I1. If the zoom factor ZF is not less than the second reference value rv2 (Yes), in an operation S240, the image processing system 100 may generate the output image OI based on a correction image that is generated by correcting the first image and the second image. The image processing system 100 may generate the correction image by correcting locations of reference coordinates of the second image based on the reference coordinates of the first image. The correction image may be generated as the output image OI.

In an operation S250, the image processing system 100 may determine whether the zoom factor ZF is not less than the fourth reference value rv4. If the zoom factor ZF is less than the fourth reference value rv4 (No), the process may proceed back to the operation S240 to repeat the process of generating the correction image. If the zoom factor ZF is not less than the fourth reference value rv4 (Yes), in an operation S260, the image processing system 100 may stop the correction operation and may generate the output image OI based on the second image I2.

Figure 8:
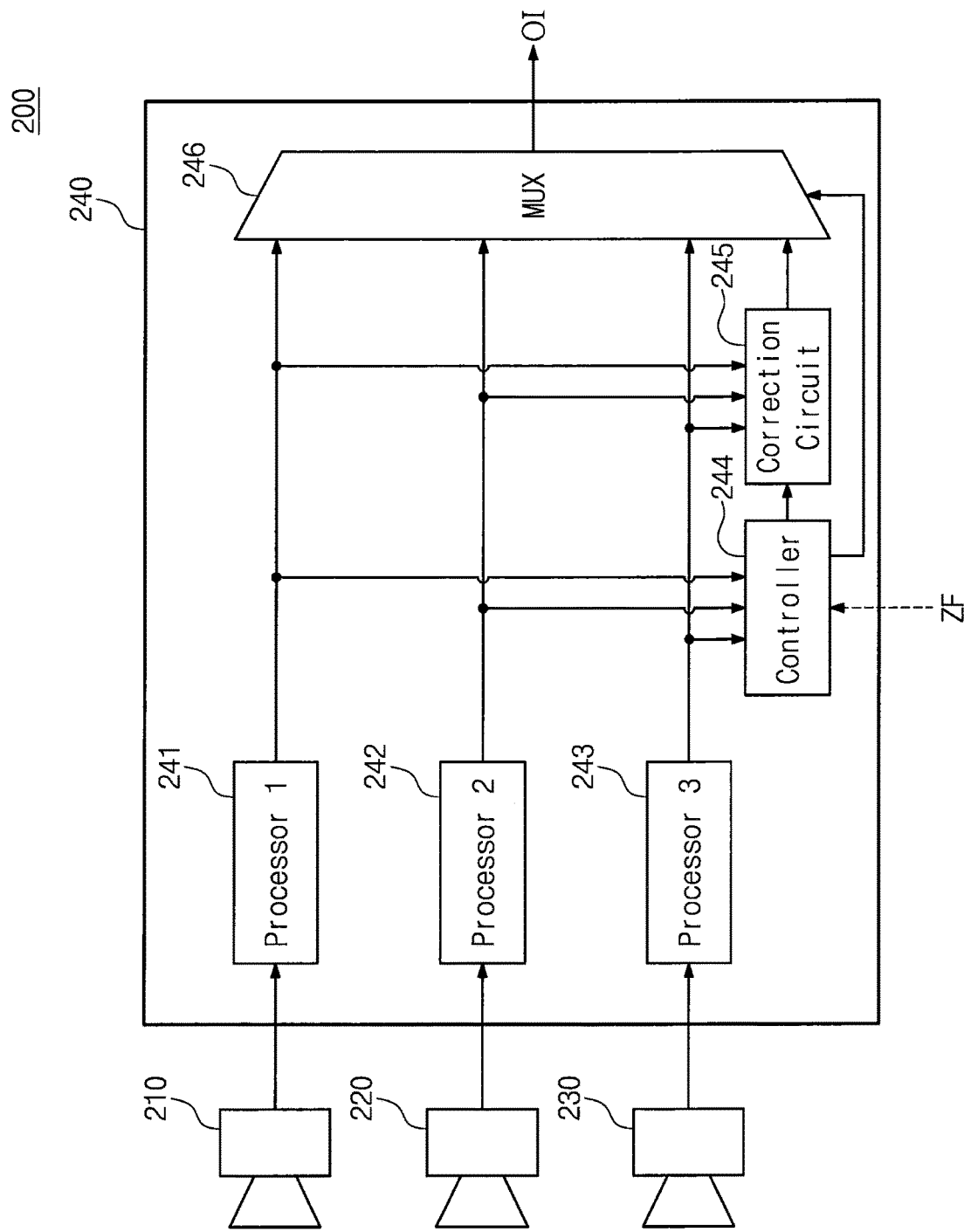
FIG. 8 is a block diagram illustrating an image processing system, according to some embodiments of the inventive concepts.

FIG. 8 is a block diagram illustrating an image processing system, according to some embodiments of the inventive concepts. Referring to FIG. 8, an image processing system 200 may include a first image sensor 210, a second image sensor 220, a third image sensor 230, and an image processing device 240. The first image sensor 210, the second image sensor 220, and the third image sensor 230 will be described with reference to FIG. 9.

Figure 9:
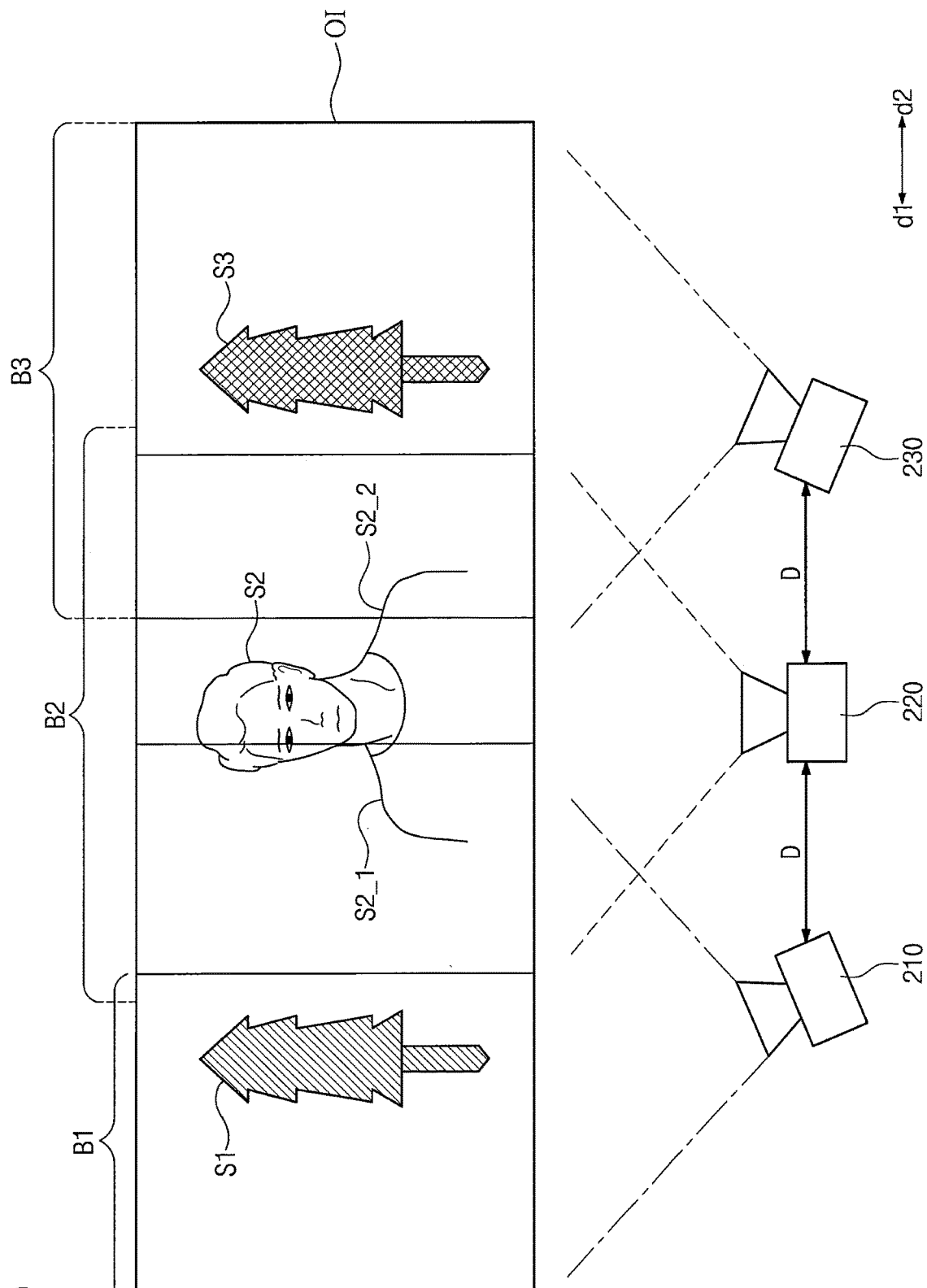
FIG. 9 is a conceptual block diagram illustrating operations of methods in which a subject is photographed by first to third image sensors, according to some embodiments of the inventive concepts.

FIG. 9 is a conceptual block diagram illustrating operations of methods in which a subject is photographed by first to third image sensors, according to some embodiments of the inventive concepts. Referring to FIGS. 8 and 9, the first to third image sensors 210 to 230 may be arranged to be spaced apart from each other by the same distance D. For example, the first image sensor 210 may be situated in the first direction d1, and the third image sensor 230 may be situated in the second direction d2 that is opposite to the first direction d1. The second image sensor 220 may be situated between the first image sensor 210 and the third image sensor 230.

Since the first to third image sensors 210 to 230 are spaced apart from each other by the physical distance D, the first to third image sensors 210 to 230 may respectively photograph subjects S1 to S3 at different angles. For example, the first image sensor 210 may photograph a first area B1 including a first subject S1 and a portion S2_1 of a second subject S2. The second image sensor 220 may photograph a second area B2 including the second subject S2. The third image sensor 230 may photograph a third area B3 including a third subject S3 and a portion S2_2 of the second subject S2.

Returning to FIG. 8, the first to third image sensors 210 to 230 may respectively generate first to third image data based on the photographing results. The first to third image data may be transmitted to the image processing device 240.

The image processing device 240 may include a first processor 241, a second processor 242, a third processor 243, a controller 244, a correction circuit 245, and a multiplexer 246. The first, second, and third processors 241, 242, and 243 may respectively receive first, second, and third image data. The first, second, and third processors 241, 242, and 243 may respectively eliminate noise of first, second, and third image data and may correct a distortion values and white balance thereof.

The first processor 241 may correct the first image data to generate a first image, and the second processor 242 may correct the second image data to generate the second image. The third processor 243 may correct the third image data to generate the third image. Each of the first to third processors 241 to 243 may transmit the corresponding image to the controller 244, the correction circuit 245, and the multiplexer 246.

The controller 244 may control overall operations of the image processing device 240. The controller 244 may receive first, second, and third image data from the first, second, and third processors 241, 242, and 243, respectively. The controller 244 may sense (or detect) the degree of focusing of the first image sensor 210, the second image sensor 220, or the third image sensor 230 or movement of the image processing system 200. Alternatively, the controller 244 may sense information about the zoom factor ZF of the output image OI.

The controller 244 may control the correction circuit 245 when photographing switching occurs between the first to third image sensors 210 to 230. For example, the controller 244 may control warping correction of an image that is performed by the correction circuit 245. For example, the controller 244 may provide the correction circuit 245 with information about first reference coordinates of the first image, second reference coordinates of the second image, and third reference coordinates of the third image. The first reference coordinates of the first image may be set based on coordinates of pixels of the first image. The second reference coordinates of the second image may be set based on coordinates of pixels of the second image. The third reference coordinates of the third image may be set based on coordinates of pixels of the third image.

The controller 244 may control a time when the warping correction is made in the correction circuit 245. For example, the controller 244 may include a timer for controlling a time to make warping correction. Under control of the controller 244, the warping correction may be made during a reference time in the correction circuit 245. The controller 244 may stop an operation of the correction circuit 245 when the reference time elapses.

Alternatively, the controller 244 may count the number of frames of each of the received first and second images. The controller 244 may include a counter circuit to count the number of frames of each of the first and second images.

For example, when photographing switching occurs between the first to third image sensors 210 to 230, the controller 244 may count the number of frames of each of the first to third images from a point in time when the warping correction of the correction circuit 245 starts. Under control of the controller 244, the correction circuit 245 may perform the warping correction until the number of frames of each of the first to third images reaches a reference count. The controller 244 may stop an operation of the correction circuit 245 when the number of frames of each of the first and second images reaches the reference count.

The correction circuit 245 may perform the warping correction on the first to third images under control of the controller 244. The correction circuit 245 may perform the warping correction by using the first to third reference coordinates of the first to third images. An image correcting method that is performed by the correction circuit 245 will be described with reference to FIGS. 10 to 14.

FIG. 10 is a conceptual flowchart diagram illustrating operations of methods in which the image processing system of FIG. 8 corrects a first image, according to some embodiments of the inventive concepts. When the correction circuit 245 generates the output image OI based on first to third images, the correction circuit 245 may correct the first to third images as one image.

Referring to FIG. 10, a first image J1 photographed by the first image sensor 210 and a second image J2 photographed by the second image sensor 220 may be partially overlapped. The first image J1 and the second image J2 may be photographed at different angles. For this reason, a portion S2_1 of the second subject S2 included in the first image J1 and the portion S2_1 of the second subject S2 included in the second image J2 may not be matched with each other. The correction circuit 245 may perform the warping correction for matching with the portion S2_1 of the second subject S2 included in an overlapped area. For example, the correction circuit 245 may perform the warping correction on the first image J1 based on the second image J2. This is only an example, and the correction circuit 245 may perform the warping correction on the second image J2 based on the first image J1.

For example, an area of the first image J1, which is overlapped with the second image J2, may be defined by first reference coordinates "a", "b", "c", and "d". An area of the second image J2, which is overlapped with the first image J1, may be defined by second reference coordinates "A", "B", "C", and "D". In each of the first and second images J1 and J2, an overlapped area may be defined by four coordinates. This is only an example, and an overlapped area may be defined by five or more coordinates in each of the first and second images J1 and J2.

To perform the warping correction, the correction circuit 245 may move the first reference coordinates "a", "b", "c", and "d" of the first image J1 to the second reference coordinates "A", "B", "C", and "D" of the second image J2, respectively. The correction circuit 245 may correct the first image J1 to generate a corrected first image J1'. In this case, the portion S2_1 of the second subject S2 included in the corrected first image J1' and the portion S2_1 of the second subject S2 included in the second image J2 may be matched with each other.

FIG. 11 is a conceptual flowchart diagram illustrating operations of methods in which the image processing system of FIG. 8 corrects a second image, according to some embodiments of the inventive concepts. Referring to FIG. 11, the second image J2 and a third image J3 photographed by the third image sensor 230 may be partially overlapped. The second image J2 and the third image J3 may be photographed at different angles. For this reason, a portion S2_2 of the second subject S2 included in the second image J2 and the portion S2_2 of the second subject S2 included in the third image J3 may not be matched with each other. The correction circuit 245 may perform the warping correction for matching with the portion S2_2 of the second subject S2 included in an overlapped area. For example, the correction circuit 245 may perform the warping correction on the third image J3 based on the second image J2. This is only an example, and the correction circuit 245 may perform the warping correction on the second image J2 based on the third image J3.

For example, an area of the third image J3, which is overlapped with the second image J2, may be defined by third reference coordinates "e", "f", "g", and "h". For example, an area of the second image J2, which is overlapped with the third image J3, may be defined by fourth reference coordinates "E", "F", "G", and "H". In each of the second and third images J2 and J3, an overlapped area may be defined by four coordinates. This is only an example, and an overlapped area may be defined by five or more coordinates in each of the second and third images J2 and J3.

To perform the warping correction, the correction circuit 245 may move the third reference coordinates "e", "f", "g", and "h" of the third image J3 to the fourth reference coordinates "E", "F", "G", and "H" of the second image J2, respectively. The correction circuit 245 may correct the third image J3 to generate a corrected third image J3'. In this case, the portion S2_2 of the second subject S2 included in the corrected third image J3' and the portion S2_2 of the second subject S2 included in the second image J2 may be matched with each other.

Figure 12:
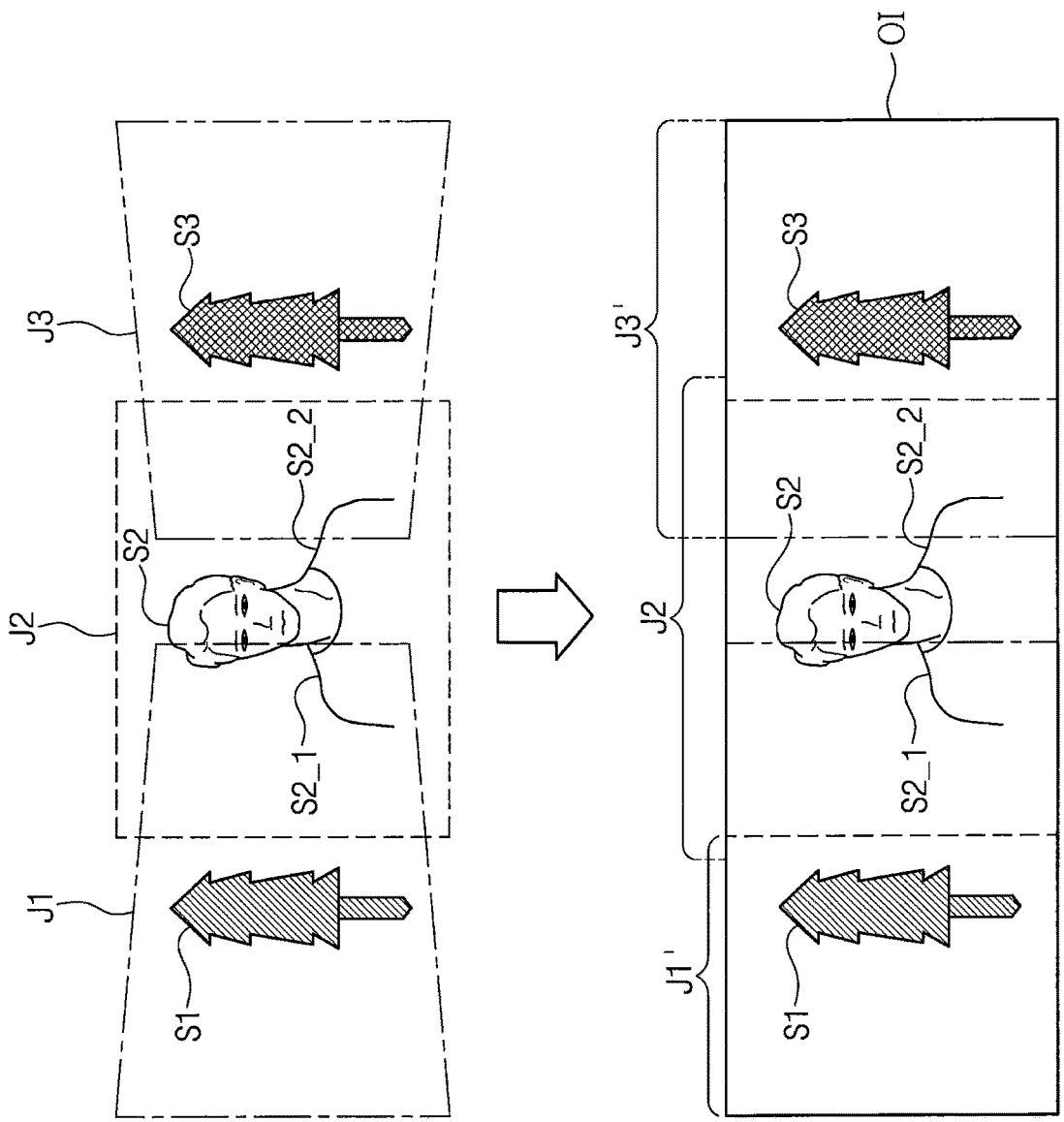
FIG. 12 is a conceptual flowchart diagram illustrating operations of methods in which an output image is generated by the image processing system of FIG. 8, according to some embodiments of the inventive concepts.

FIG. 12 is a conceptual flowchart diagram illustrating operations of methods in which an output image is generated by the image processing system of FIG. 8, according to some embodiments of the inventive concepts. Referring to FIGS. 10 to 12, the correction circuit 245 may generate one output image OI based on the corrected first image J1', the second image J2, and the corrected third image J3'. Electric energy consumed by the image processing system 200 in the warping correction may increase.

Returning to FIG. 8, photographing of some of the first to third image sensors 210 to 230 may be interrupted. For example, the controller 244 may selectively receive an image(s) from the first to third image sensors 210 to 230 when a user request is received or when photographing switching occurs between the first to third image sensors 210 to 230. An operating method of the image processing system 100 when photographing of some of the first to third image sensors 210 to 230 is interrupted will be described with reference to FIGS. 13 and 14.

Figure 13:
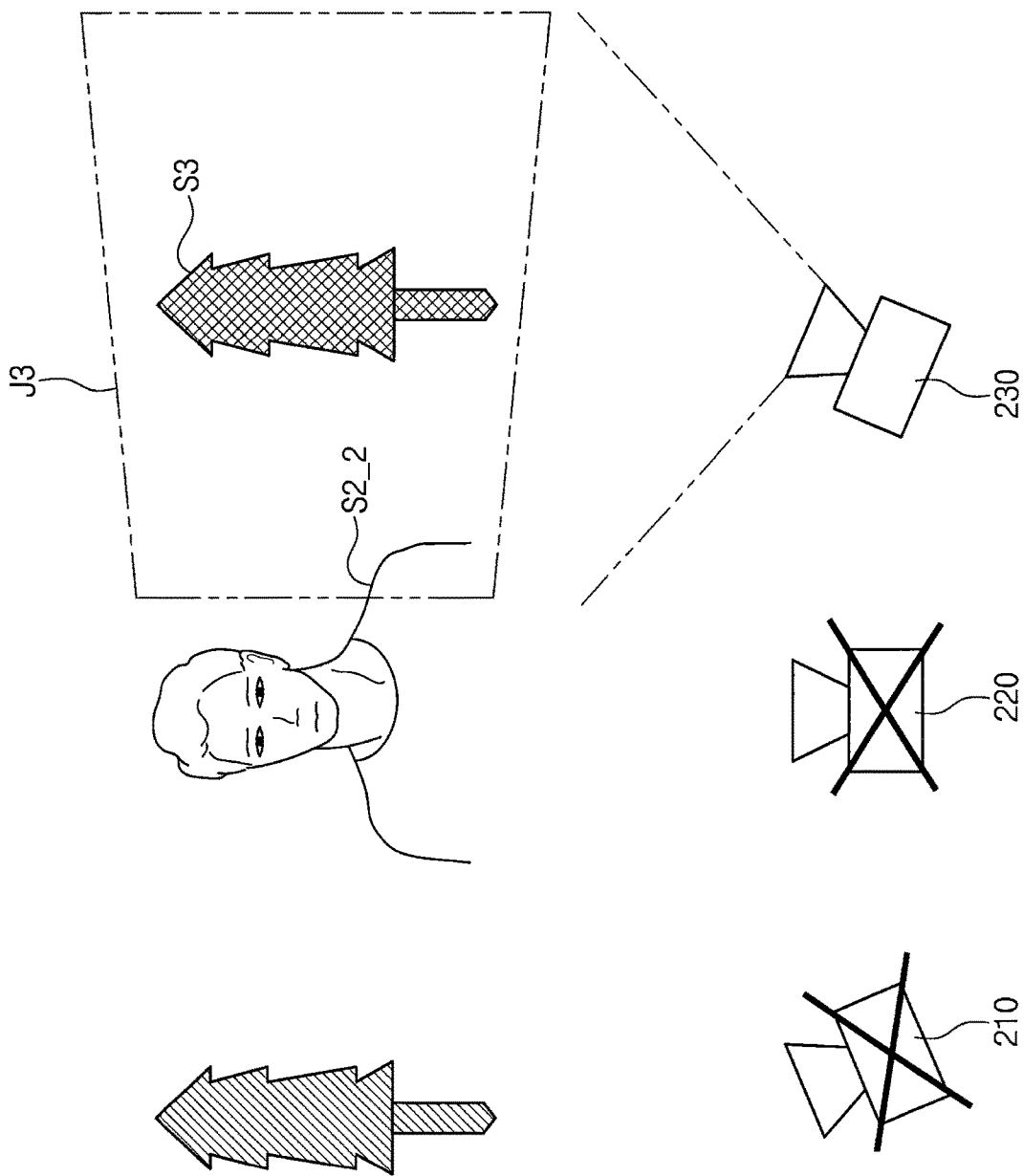
FIG. 13 is a conceptual block diagram illustrating operations of image photographing methods of third image sensor methods in the image processing system of FIG. 8, according to some embodiments of the inventive concepts.
Figure 14:
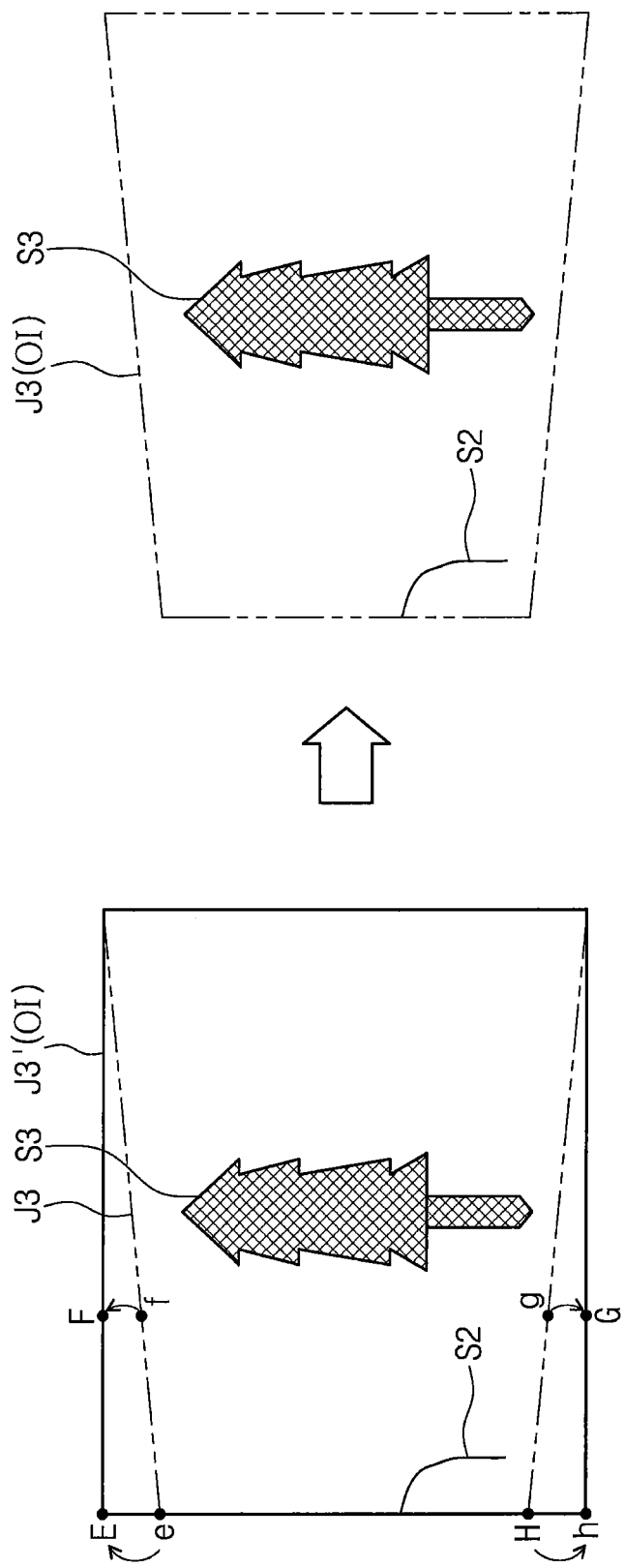
FIG. 14 is a conceptual flowchart diagram illustrating operations of methods in which the image processing system of FIG. 8 generates an output image, according to some embodiments of the inventive concepts.

FIG. 13 is a conceptual block diagram illustrating operations of image photographing methods of third image sensor methods in the image processing system of FIG. 8, according to some embodiments of the inventive concepts. FIG. 14 is a conceptual flowchart diagram illustrating operations of methods in which the image processing system of FIG. 8 generates an output image, according to some embodiments of the inventive concepts. Referring to FIGS. 9 and 13, the first and second image sensors 210 and 220 may not perform photographing, and only the third image sensor 230 may perform photographing. The third image sensor 230 may photograph the portion of a second subject S2_2 and the third subject S3.

Referring to FIG. 14, the correction circuit 245 may correct the third image J3 based on the second image J2 to generate the corrected third image J3'. A method in which the correction circuit 245 generates the corrected third image J3' may be similar to or the same as the method described with reference to FIG. 11. A detailed description on the method in which the correction circuit 245 generates the corrected third image J3' may be thus omitted. The corrected third image J3' may be generated as the output image OI.

Photographing of the first and second image sensors 210 and 220 may be interrupted while the output image OI is generated based on first to third images photographed by the first to third image sensors 210 to 230. A location of a subject (e.g., the portion S2_2 of the second subject) included in the output image OI may be changed when the third image J3 is directly outputted as the output image OI without the warping correction. To prevent a location change of the subject, the correction circuit 245 may perform the corrected third image J3' as the output image OI. The correction circuit 245 may perform the warping correction on the third image J3 during a first time.

In this case, electric energy consumed by the image processing system 100 may be smaller than electric energy consumed when one output image OI is generated based on the corrected first image J1', the second image J2, and the corrected third image J3'. However, a lot of electric energy may be still consumed by the image processing system 200. After the first time, the correction circuit 245 may output the third image J3 as the output image OI. If the warping correction is interrupted, electric energy consumed by the image processing system 200 may decrease.

Returning to FIG. 8, the correction circuit 245 may perform the warping correction in the same method as that described with reference to 14. The correction circuit 245 may transmit a corrected image to the multiplexer 246.

The multiplexer 246 may receive first, second, and third image data from the first, second, and third processors 241, 242, and 243, respectively. The multiplexer 246 may receive the corrected image from the correction circuit 245. The multiplexer 246 may select one of the first image, the second image, and the correction image as the output image OI under control of the controller 244.

According to some embodiments of the inventive concepts, the image processing system 200 may perform the warping correction only during the reference time and may generate an output image without performing the warping correction if the reference time elapses. According to some embodiments of the inventive concepts, the image processing system 200 may reduce power consumption by shortening a warping correction time.

Figure 15:
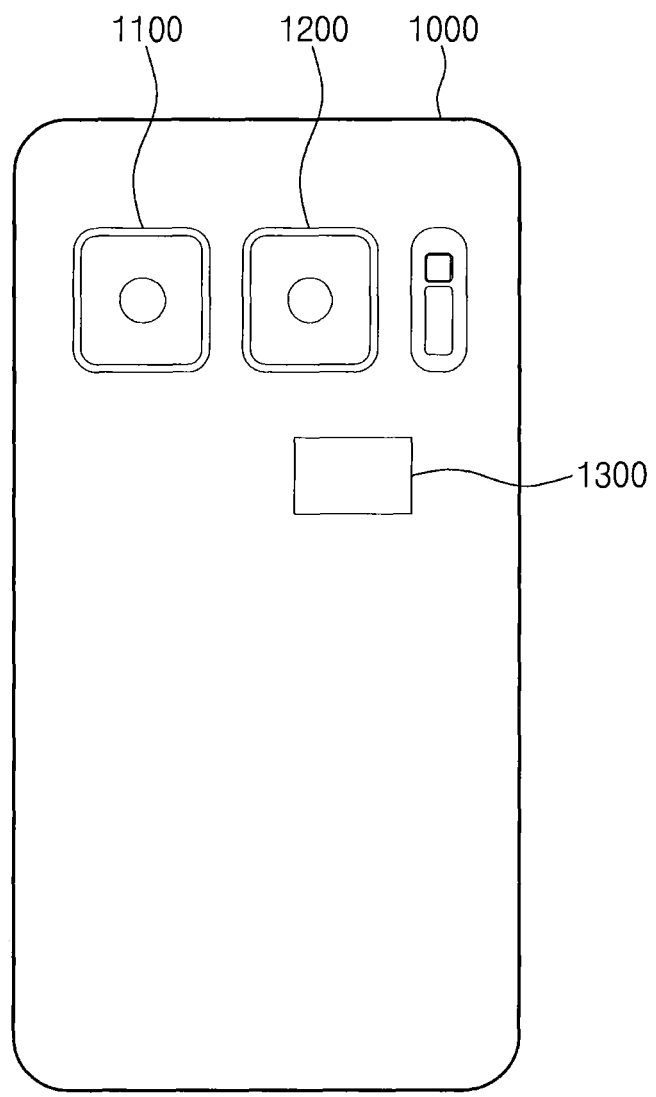
FIG. 15 is a block diagram illustrating an electronic device including an image processing system, according to some embodiments of the inventive concepts.

FIG. 15 is a block diagram illustrating an electronic device including an image processing system, according to some embodiments of the inventive concepts. An electronic device 1000 may be a smartphone. However, embodiments of the inventive concepts are not limited thereto. For example, the electronic device 1000 may be one of a cellular phone, a tablet PC, a notebook computer, a digital camera, a smart ring, and a smart watch. Referring to FIG. 15, the electronic device 1000 may include two image sensors 1100 and 1200. For example, the first image sensor 1100 may photograph a subject by using an wide angle lens, and the second image sensor 1200 may photograph the subject by using a telephoto lens.

The electronic device 1000 may include an image processing device 1300 for processing images photographed by the first and second image sensors 1100 and 1200. The image processing device 1300 may process the images based on the devices and methods described with reference to one or more of FIGS. 1 to 14.

According to some embodiments of the inventive concepts, the electronic device 1000 may perform the warping correction only during a reference time and may generate an output image without performing the warping correction if the reference time elapses. According to some embodiments of the inventive concepts, the electronic device 1000 may reduce power consumption by shortening a warping correction time.

According to some embodiments of the inventive concepts, in an image processing system and an electronic device including the same, power consumption of the electronic device may be reduced by reducing computation needed to correct photographed images, and thus power efficiency may be improved.

While the inventive concepts have been described with reference to some embodiments, various changes and modifications may be made without departing from the inventive concepts. Therefore, the above embodiments are not limiting, but illustrative.

What is claimed is:

1. An image processing system comprising:
a first image sensor configured to generate a first image data;
a second image sensor configured to generate a second image data;
a third image sensor configured to generate a third image data;
an image processing device comprising:
a first processor configured to process the first image data received from the first image sensor and generate a first image;
a second processor configured to process the second image data received from the second image sensor and generate a second image;
a controller configured to receive a zoom factor;
a correction circuit configured to receive a third image based on the third image data, the first image, and the second image, perform a warping correction by correcting locations of second reference coordinates of the second image based on first reference coordinates of the first image and by correcting locations of third reference coordinates of the third image based on fourth reference coordinates of the first image, and output a corrected image generated by the warping correction under a control of the controller, wherein the first image is non-contiguous to the third image; and
a multiplexer configured to receive the first image, the second image, and the corrected image and output one of the first image data, the second image, or the corrected image under the control of the controller,
wherein the first and second processors respectively process the first image data and the second image data,
wherein multiplexer is configured to output the first image when the zoom factor is a first reference value, output the corrected image when the zoom factor is between the first reference value and a second reference value, and output the second image when the zoom factor exceeds the second reference value,
wherein the first image and the second image are partially overlapped, and
wherein a distance between the first image sensor and the second image sensor is same as a distance between the second image sensor and the third image sensor.

2. The image processing system of claim 1, wherein the first processor is configured to adjust a size of an area of the first image data and the second processor is configured to adjust a size of an area of the second image data.

3. The image processing system of claim 1, wherein the first reference coordinates of the first image are based on coordinates of pixels of the first image.

4. The image processing system of claim 3, wherein the first and third image sensors are sequentially arranged.

5. The image processing system of claim 3, wherein the image processing system comprises a cellular phone.

6. The image processing device of claim 1, wherein the controller is configured to enable the correction circuit in a first time and disable the correction circuit in a second time.

7. The image processing system of claim 3,
wherein the image processing device further comprises: a third processor configured to process the third image data received from the third image sensor and generate the third image, and
wherein the multiplexer is further configured to receive the third image.

8. The image processing system of claim 7, wherein the second image and the third image are partially overlapped.

9. An image processing system comprising:
a first image sensor configured to generate a first image data;
a second image sensor configured to generate a second image data;
a third image sensor configured to generate a third image data;
an image processing device comprising:
a first processor configured to process the first image data received from the first image sensor and generate a first image;
a second processor configured to process the second image data received from the second image sensor and generate a second image;

a third processor configured to process the third image data received from the third image sensor and generate a third image;
a controller configured to receive a zoom factor;
a correction circuit configured to receive the first image, the second image, and the third image, perform a warping correction by correcting locations of second reference coordinates of the second image based on first reference coordinates of the first image and by correcting locations of third reference coordinates of the third image based on fourth reference coordinates of the first image, and output a corrected image generated by the warping correction under a control of the controller, wherein the first image is non-contiguous to the third image; and
a multiplexer configured to receive the first image, the second image, and the corrected image and output one of the first image data, the second image, or the corrected image under the control of the controller,
wherein the first and second processors respectively process the first image data and the second image data,
wherein multiplexer is configured to output the first image when the zoom factor is a first reference value, output the corrected image when the zoom factor is between the first reference value and a second reference value, and output the second image when the zoom factor exceeds the second reference value, and
wherein the first image and the second image are partially overlapped.

10. The image processing system of claim 9, wherein the second image and the third image are partially overlapped.

11. The image processing system of claim 10, wherein the first processor is configured to adjust a size of an area of the first image data and the second processor is configured to adjust a size of an area of the second image data.

12. The image processing system of claim 11, wherein the first reference coordinates of the first image are based on coordinates of pixels of the first image.

13. The image processing system of claim 12, wherein the first and third image sensors are sequentially arranged.

14. The image processing system of claim 12, wherein the multiplexer is further configured to receive the third image.

15. The image processing system of claim 14, wherein the image processing system comprises a cellular phone.

16. An image processing system comprising:
a first image sensor configured to generate a first image data;
a second image sensor configured to generate a second image data;
a third image sensor configured to generate a third image data;
an image processing device comprising:
a first processor configured to process the first image data received from the first image sensor and generate a first image;
a second processor configured to process the second image data received from the second image sensor and generate a second image;
a third processor configured to process the third image data received from the third image sensor and generate a third image;
a controller configured to receive a zoom factor;
a correction circuit configured to receive the first image, the second image, and the third image, perform a warping correction by correcting locations of second reference coordinates of the second image based on first reference coordinates of the first image and by correcting locations of third reference coordinates of the third image based on fourth reference coordinates of the first image, and output a corrected image generated by the warping correction under a control of the controller, wherein the first image is non-contiguous to the third image; and
a multiplexer configured to receive the first image, the second image, and the corrected image and output one of the first image data, the second image, or the corrected image under the control of the controller,
wherein the first and second processors respectively process the first image data and the second image data,
wherein multiplexer is configured to output the first image when the zoom factor is a first reference value, output the corrected image when the zoom factor is between the first reference value and a second reference value, and output the second image when the zoom factor exceeds the second reference value,
wherein the first image and the second image are partially overlapped, and
wherein a distance between the first image sensor and the second image sensor is same as a distance between the second image sensor and the third image sensor.

17. The image processing system of claim 16, wherein the second image and the third image are partially overlapped.

18. The image processing system of claim 1,
wherein the warping correction comprises transforming coordinates of pixels of the second image data into reference coordinates according to homography or remapping.

19. The image processing system of claim 1,
wherein a degree of warping correction is determined by a correction coefficient value used for performing remapping or used by a matrix for a homography operation.

* * * * *